United States Patent
Hahn et al.

(10) Patent No.: US 10,572,185 B2
(45) Date of Patent: Feb. 25, 2020

(54) NON-VOLATILE STORAGE SYSTEM WITH COMMAND REPLAY

(71) Applicant: WESTERN DIGITAL TECHNOLOGIES, INC., San Jose, CA (US)

(72) Inventors: Judah Gamliel Hahn, Ofra (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/995,590

(22) Filed: Jun. 1, 2018

(65) Prior Publication Data

US 2019/0369913 A1    Dec. 5, 2019

(51) Int. Cl.
| | | |
|---|---|---|
| *G06F 12/00* | (2006.01) | |
| *G06F 3/06* | (2006.01) | |
| *G06F 9/4401* | (2018.01) | |
| *G06F 13/00* | (2006.01) | |
| *G06F 13/28* | (2006.01) | |

(52) U.S. Cl.
CPC .......... *G06F 3/0659* (2013.01); *G06F 3/0613* (2013.01); *G06F 3/0656* (2013.01); *G06F 3/0679* (2013.01); *G06F 9/4401* (2013.01)

(58) Field of Classification Search
CPC .... G06F 3/0659; G06F 3/0656; G06F 9/4401; G06F 3/0679; G06F 3/0613
See application file for complete search history.

(56) References Cited

U.S. PATENT DOCUMENTS

| | | | | |
|---|---|---|---|---|
| 6,205,548 | B1 * | 3/2001 | Hasbun | G06F 8/65 |
| | | | | 711/170 |
| 9,804,785 | B2 * | 10/2017 | Cohen | G06F 3/0611 |
| 2008/0256352 | A1 * | 10/2008 | Chow | G06F 9/4406 |
| | | | | 713/2 |
| 2009/0158023 | A1 * | 6/2009 | Kern | G06F 9/4401 |
| | | | | 713/2 |
| 2014/0115253 | A1 * | 4/2014 | Grusy | G06F 3/0619 |
| | | | | 711/114 |
| 2014/0181372 | A1 * | 6/2014 | Liu | G06F 12/0862 |
| | | | | 711/103 |
| 2015/0033005 | A1 * | 1/2015 | Surapuram | G06F 9/4401 |
| | | | | 713/2 |
| 2016/0103480 | A1 * | 4/2016 | Sanghi | G06F 1/3228 |
| | | | | 710/313 |
| 2016/0335429 | A1 * | 11/2016 | Smith | G06F 21/57 |
| 2017/0262228 | A1 | 9/2017 | Kanno | |

(Continued)

OTHER PUBLICATIONS

Strass, Hermann, An Introduction to NVMe, Seagate, 2016, 8 pages.

(Continued)

*Primary Examiner* — Mark A Giardino, Jr.
(74) *Attorney, Agent, or Firm* — Vierra Magen Marcus LLP

(57) ABSTRACT

A memory system includes a non-volatile memory and a controller connected to the non-volatile memory. The controller is configured to receive a set of commands from a host during a first host startup sequence, write the set of commands in the non-volatile memory, and in response to receiving an indicator from the host, execute the set of commands written in the non-volatile memory during a second host startup sequence.

20 Claims, 19 Drawing Sheets

(56) References Cited

U.S. PATENT DOCUMENTS

2018/0253238 A1* 9/2018 Kotary .................. G06F 9/4401
2018/0285126 A1* 10/2018 Ganesan ............... G06F 9/4411

OTHER PUBLICATIONS

NVM Express Revision 1.3, May 1, 2017, 282 pages.
Huffman, Amber, NVM Express: Optimized Interface for PCI Express* SSDs, Intel Corporation, 58 pages.
Sandisk, https://kb.sandisk.com/app/answers/detail/a_id/8146/~/native-command- . . . 1, 2 pages.
NVMe Express Introduction Overview, 5 pages.
SNIA Solid State Storage Initiative, PCie SSD 101, An Overview of Standards, Markets and Performance, 32 pages.

* cited by examiner

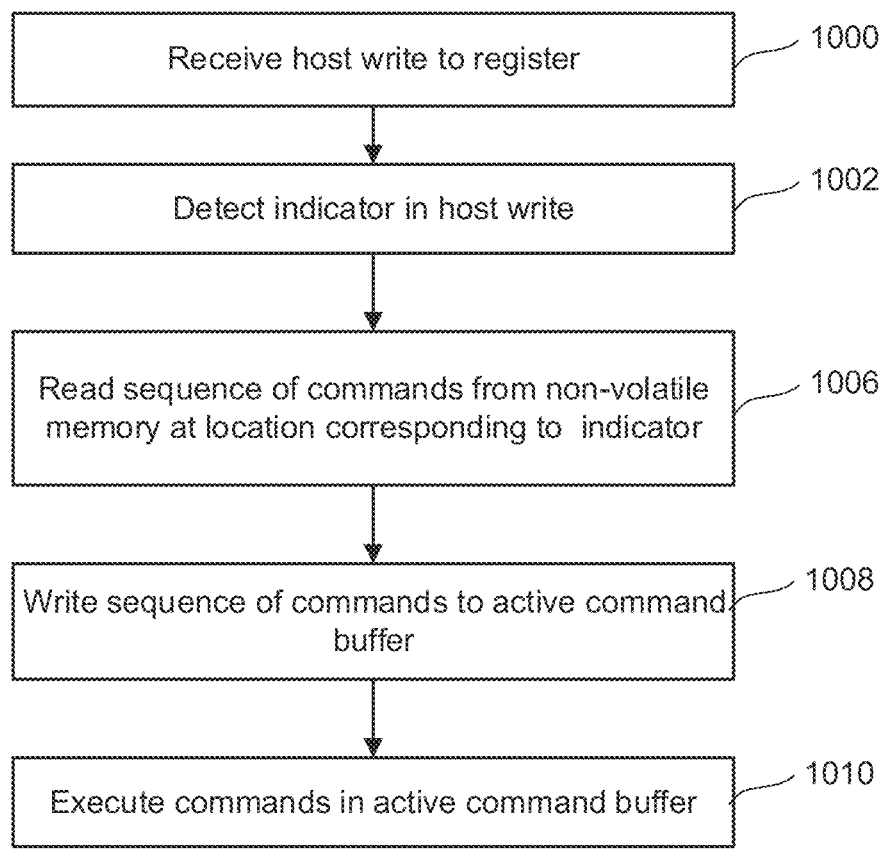
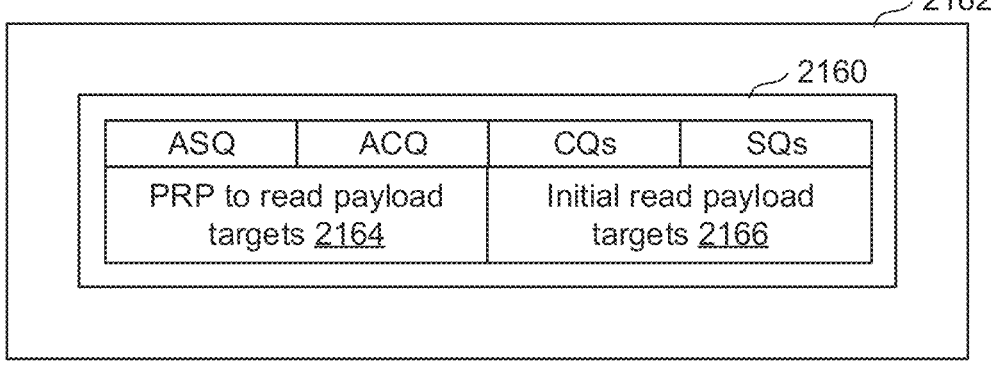

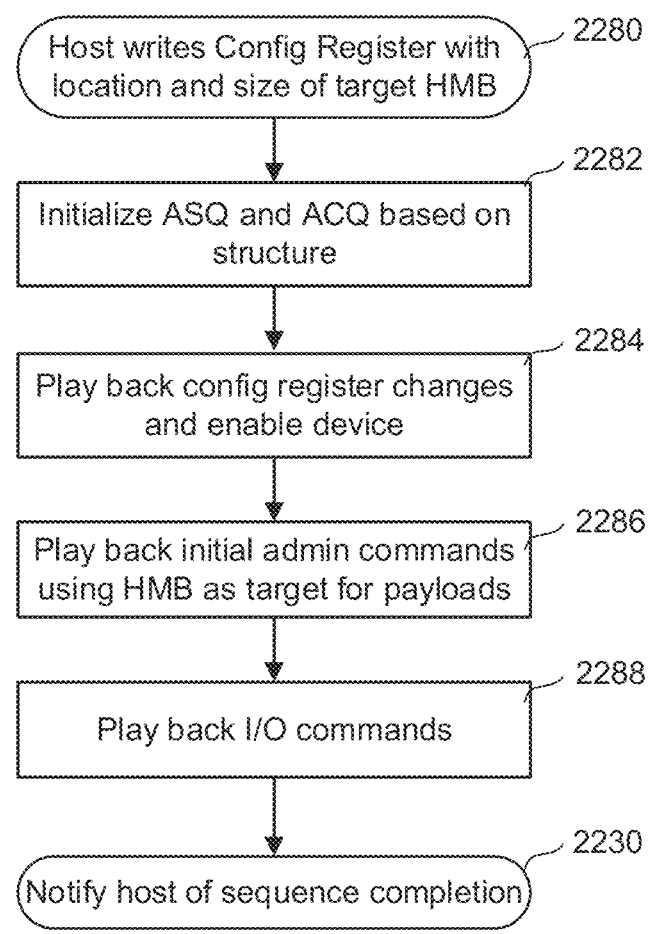

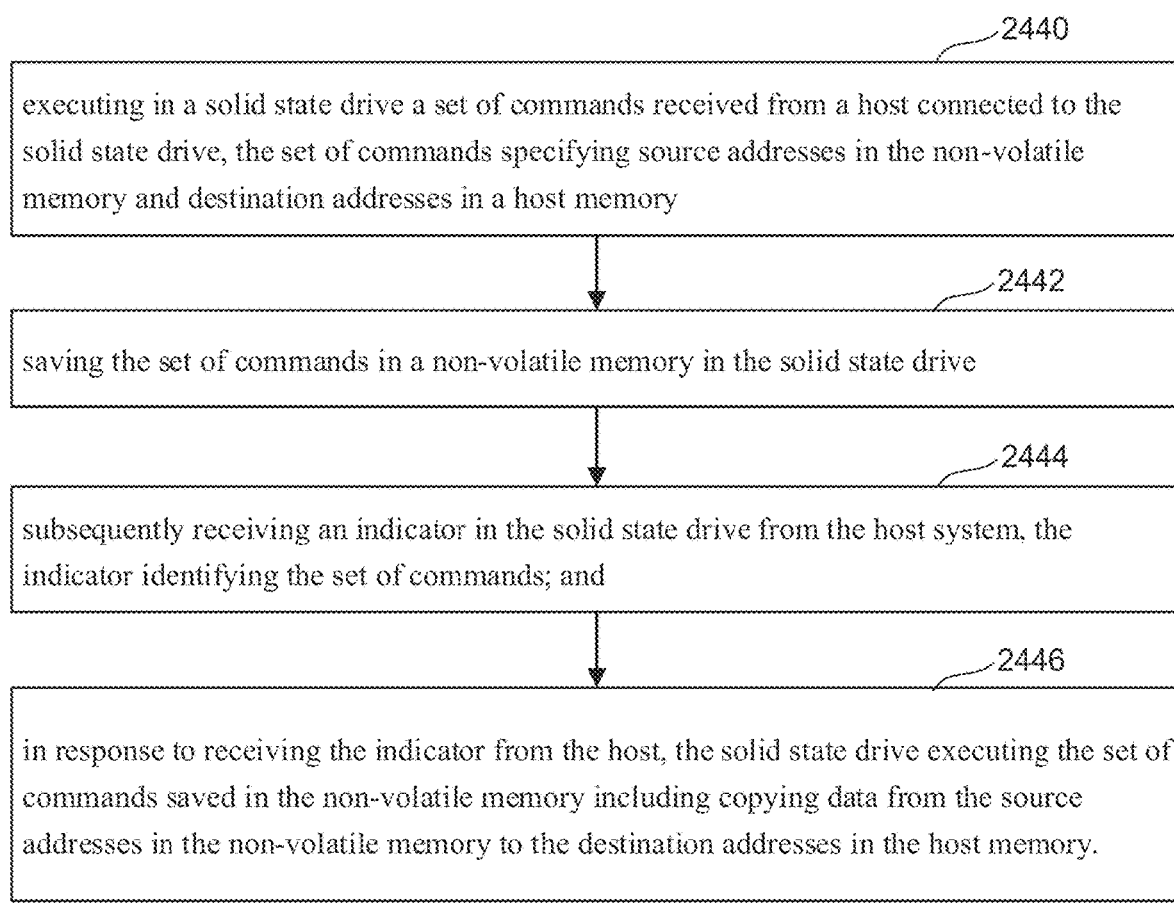

NON-VOLATILE STORAGE SYSTEM WITH COMMAND REPLAY

BACKGROUND

Many electronic devices make use of memory systems. Often, the memory system includes non-volatile memory such as flash memory. An electronic device that includes a memory system, or is connected to a memory system, is often referred to as a host.

A memory system that includes semiconductor memory may be in communication with a host through an interface. In some cases, more than one data storage device may be in communication with a host system through one or more interfaces. Various standardized interfaces may be used for communication between components including data storage devices and a host system, including Peripheral Component Interface (PCI), PCI express (PCIe), Serial ATA (SATA), Serial Attached SCSI (SAS), Non-Volatile Memory Host Controller Interface Specification (NVMHCIS) or Non-Volatile Memory Express (NVMe), and other interfaces.

BRIEF DESCRIPTION OF THE DRAWINGS

Like-numbered elements refer to common components in the different figures.

FIG. 10 is a flow chart describing one embodiment of a process for replaying (or re-executing) a sequence of commands.

FIGS. 11A-B show an example of a Host Memory Buffer (HMB) storing a fixed structure.

FIG. 12 is a flow chart describing one embodiment of a process for configuring a HMB and using it for replaying commands.

FIG. 21 illustrates an example of a method that includes saving a set of commands in non-volatile memory and executing them in response to receiving an indicator from the host.

DETAILED DESCRIPTION

In some cases, where a host is connected to a memory system through an interface, a host may send the same sequence of commands more than once. For example, commands sent by a host during a host startup routine may be sent again during a subsequent host startup routine. Examples of the present technology include logging such sequences of commands and writing them in non-volatile memory. These sequences of commands can then be replayed by the memory system when the host indicates that they should be replayed (e.g. during a subsequent host startup routine). More than one sequence of commands may be logged and written in non-volatile memory and a host may request replay of a particular sequence of commands by sending a corresponding indicator to the memory system. Reading such sequences of commands from non-volatile memory and replaying them in response to an indicator may be faster than individually sending commands from a host and executing them. Thus, a host startup in which a memory system replays a stored sequence of commands may be faster than a similar host startup in which each command is sent by the host and individually executed by the memory system, which may include additional interactions between the host and the memory system.

In some cases, where a host sends an indicator corresponding to a sequence of commands, the host may also ensure that appropriate structures are in place in host memory for execution of the corresponding sequence of commands. For example, addresses used for execution of read commands may be identical and a memory system may access the same locations in host memory when executing read commands during replay as were used during a logged sequence of commands. In some cases, host memory addresses used for execution of logged sequences of commands may be in a Host Memory Buffer (HMB), which may reduce risk that the memory system would overwrite host data when replaying a sequence of commands. For example, data transferred by a memory system from non-volatile memory to host memory may be written in a HMB to avoid putting host data at risk of being overwritten.

Figure 1:
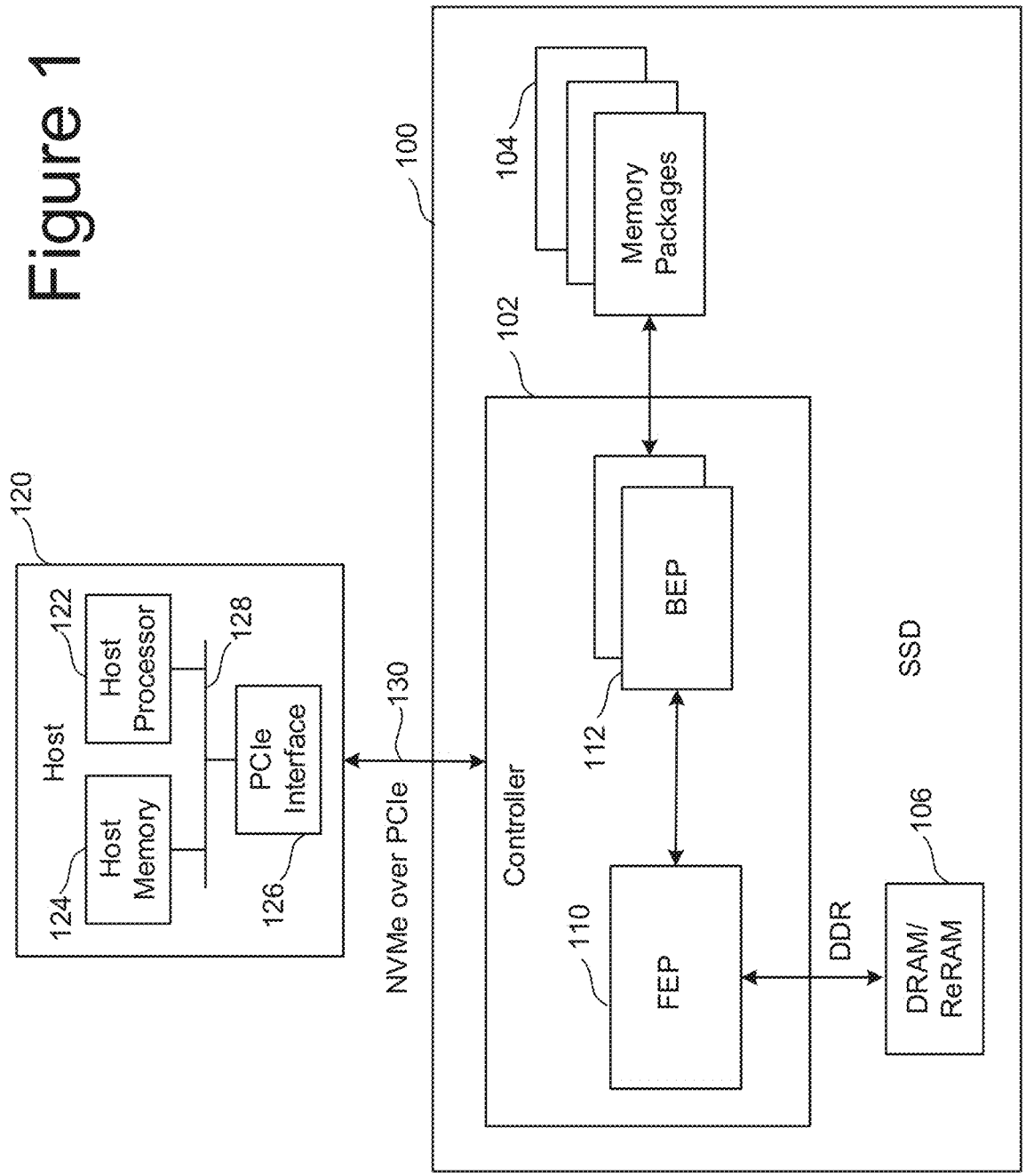
FIG. 1 is a block diagram of one embodiment of a memory system connected to a host.

FIG. 1 is a block diagram of one embodiment of a memory system 100 connected to a host 120. Memory system 100 can implement the technology proposed herein. Many different types of memory systems can be used with the technology proposed herein. One example memory system is a solid state drive ("SSD"). Memory system comprises a Controller 102, non-volatile memory 104 for storing data, and local memory (e.g. DRAM/ReRAM) 106. Controller 102 comprises a Front End Processor Circuit (FEP) 110 and one or more Back End Processor Circuits (BEP) 112. In one embodiment FEP 110 circuit is implemented on an ASIC. In one embodiment, each BEP circuit 112 is implemented on a separate ASIC. The ASICs for each of the BEP circuits 112 and the FEP circuit 110 are implemented on the same semiconductor such that the Controller 102 is manufactured as a System on a Chip ("SoC"). FEP 110 and BEP 112 both include their own processors. In one embodiment, FEP 110 and BEP 112 work as a master slave configuration where the FEP 110 is the master and each BEP 112 is a slave. For example, FEP circuit 110 implements a flash translation layer that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory packages/die at the request of FEP circuit 110. For example, the BEP circuit 112 can carry out the read, erase and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages.

In one embodiment, non-volatile memory 104 comprises a plurality of memory packages. Each memory package includes one or more memory die. Therefore, Controller 102 is connected to one or more non-volatile memory die. In one embodiment, each memory die in the memory packages 14 utilize NAND flash memory (including two dimensional NAND flash memory and/or three dimensional NAND flash memory). In other embodiments, the memory package can include other types of memory.

Controller 102 communicates with host 120 via an interface 130 that implements NVM Express (NVMe) over PCI Express (PCIe). For working with memory system 100, host 120 includes a host processor 122, host memory 124, and a PCIe interface 126. Host memory 124 is the host's physical memory, and can be DRAM, SRAM, non-volatile memory or another type of storage. Host 120 is external to and separate from memory system 100 (e.g., an SSD). In one embodiment, memory system 100 is embedded in host 120.

As will be described in more detail below, Controller 102 includes a command log configured to store a copy of a sequence of commands received from host 120 and executed by the Controller 102. Controller 102 also includes a means for replaying the sequence of commands after they have been executed by reading the commands from the command log, writing the commands read to a memory on host 120, and executing (at Controller 102) the commands from host memory 124 on host 120.

Figure 2:
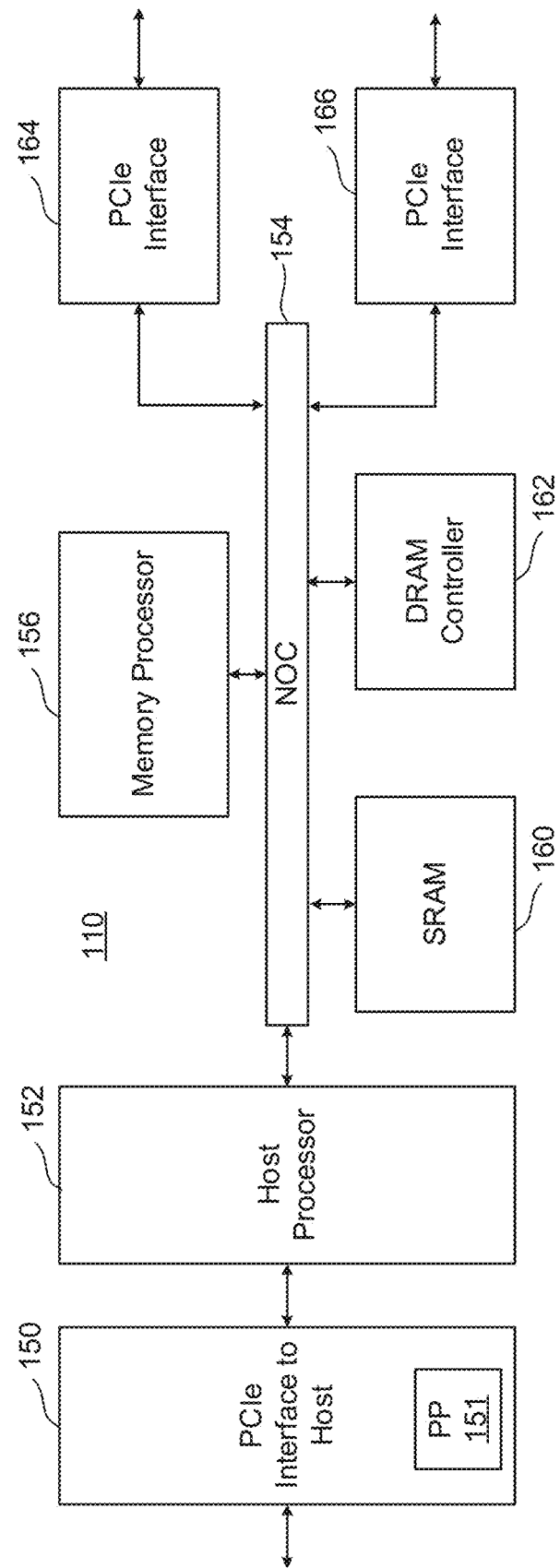
FIG. 2 is a block diagram of one embodiment of a Front End Processor Circuit. The Front End Processor Circuit is part of a Controller.

FIG. 2 is a block diagram of one embodiment of FEP circuit 110. FIG. 2 shows a PCIe interface 150 to communicate with host 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also in communication with the NOC are two PCIe Interfaces 164 and 166. In the embodiment of FIG. 2, the SSD controller will include two BEP circuits 112; therefore, there are two PCIe Interfaces 164/166. Each PCIe Interface communicates with one of the BEP circuits 112. In other embodiments, there can be more or less than two BEP circuits 112; therefore, there can be more than two PCIe Interfaces.

Figure 3:
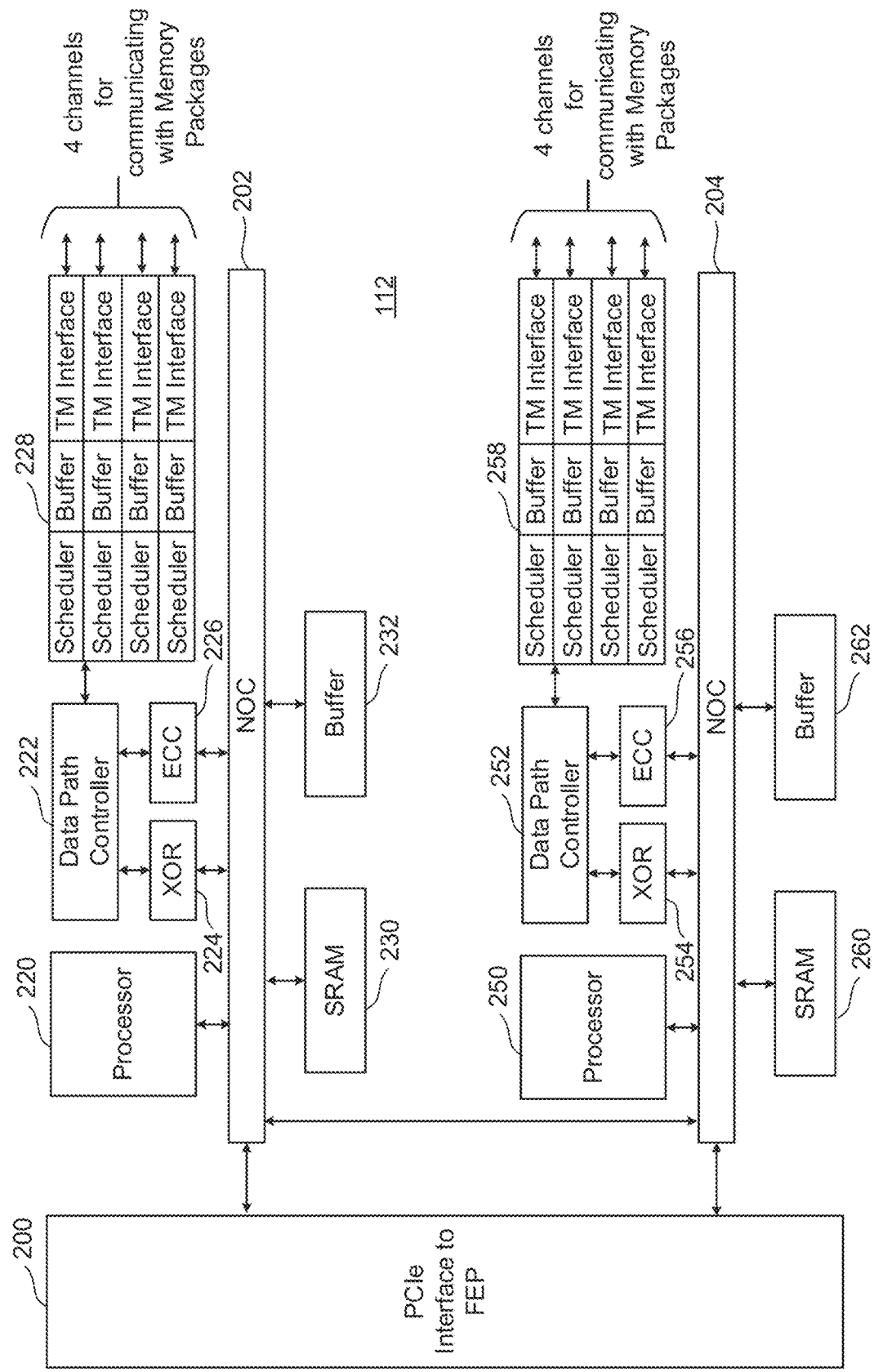
FIG. 3 is a block diagram of one embodiment of a Back End Processor Circuit. In some embodiments, the Back End Processor Circuit is part of a Controller.

FIG. 3 is a block diagram of one embodiment of the BEP circuit 112. FIG. 3 shows a PCIe Interface 200 for communicating with the FEP circuit 110 (e.g., communicating with one of PCIe Interfaces 164 and 166 of FIG. 2). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. The XOR engines 224/254 are used to XOR the data so that data can be combined and stored in a manner that can be recovered in case there is a programming error. Data path controller 22 is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. Each interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits.

Figure 4:
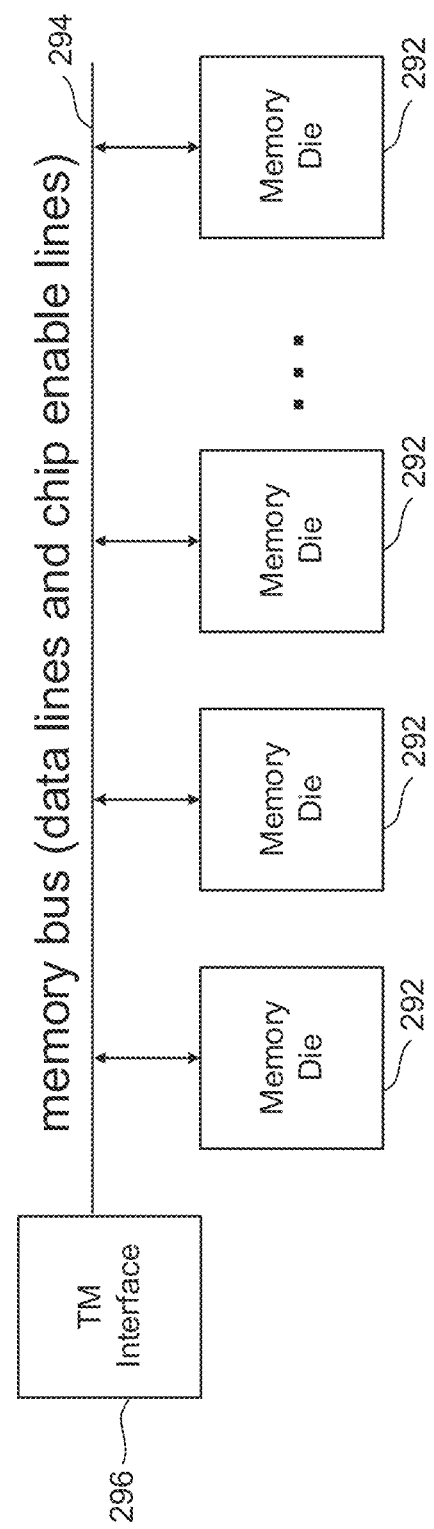
FIG. 4 is a block diagram of one embodiment of a memory package.

FIG. 4 is a block diagram of one embodiment of a memory package of non-volatile memory 104 that includes a plurality of memory die 292 connected to a memory bus 294 (data lines and chip enable lines). The memory bus 294 connects to a Toggle Mode Interface 296 for communicating with the TM Interface of a BEP circuit 112 (see e.g. FIG. 3). In some embodiments, the memory package can include a small controller connected to the memory bus and the TM Interface. The memory package can have one or more memory die. In one embodiment, each memory package includes eight or 16 memory die; however, other numbers of memory die can also be implemented. The technology described herein is not limited to any particular number of memory die.

Figure 5:
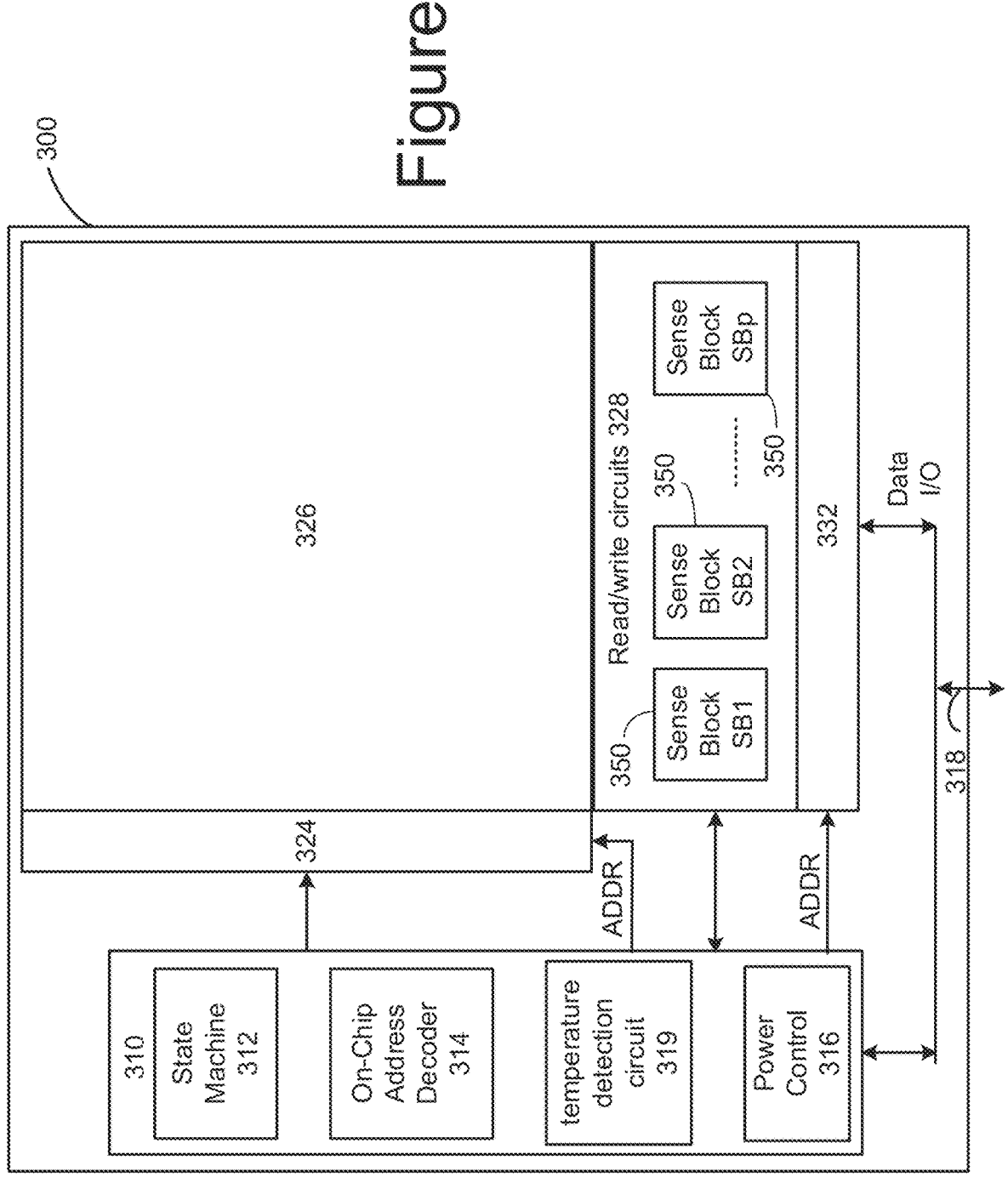
FIG. 5 is a block diagram of one embodiment of a memory die.

FIG. 5 is a functional block diagram of one embodiment of a memory die 300. The components depicted in FIG. 5 are electrical circuits. In one embodiment, each memory die 300 includes a memory structure 326, control circuitry 310, and read/write circuits 328. Memory structure 326 is addressable by word lines via a row decoder 324 and by bit lines via a column decoder 332. The read/write circuits 328 include multiple sense blocks 350 including SB1, SB2, . . . , SBp (sensing circuitry) and allow a page of memory cells to be read or programmed in parallel. Commands and data are transferred between the Controller and the memory die 300 via lines 318. In one embodiment, memory die 108 includes a set of input and/or output (I/O) pins that connect to lines 118.

Control circuitry 310 cooperates with the read/write circuits 328 to perform memory operations (e.g., write, read, and others) on memory structure 326, and includes a state machine 312, an on-chip address decoder 314, a power control module 316 (power control circuit) and a temperature detection circuit 319. State machine 312 provides die-level control of memory operations. In one embodiment, state machine 312 is programmable by software. In other embodiments, state machine 312 does not use software and is completely implemented in hardware (e.g., electrical circuits). In one embodiment, control circuitry 310 includes buffers such as registers, ROM fuses and other storage devices for storing default values such as base voltages and other parameters.

The on-chip address decoder 314 provides an address interface between addresses used by Controller 102 to the hardware address used by the decoders 324 and 332. Power control module 316 controls the power and voltages supplied to the word lines and bit lines during memory operations. Power control module 316 may include charge pumps for creating voltages. The sense blocks include bit line drivers.

In one embodiment, memory structure 326 comprises a three dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping material such as described, for example, in U.S. Pat. No. 9,721,662, incorporated herein by reference in its entirety.

In another embodiment, memory structure 326 comprises a two dimensional memory array of non-volatile memory cells. In one example, the non-volatile memory cells are NAND flash memory cells utilizing floating gates such as described, for example, in U.S. Pat. No. 9,082,502, incorporated herein by reference in its entirety. Other types of memory cells (e.g., NOR-type flash memory) can also be used.

The exact type of memory array architecture or memory cell included in memory structure 326 is not limited to the examples above. Many different types of memory array architectures or memory technologies can be used to form memory structure 326. No particular non-volatile memory technology is required for purposes of the new claimed embodiments proposed herein. Other examples of suitable technologies for memory cells of the memory structure 326 include ReRAM memories, magnetoresistive memory (e.g., MRAM, Spin Transfer Torque MRAM, Spin Orbit Torque MRAM), phase change memory (e.g., PCM), and the like. Examples of suitable technologies for memory cell architectures of the memory structure 126 include two dimensional arrays, three dimensional arrays, cross-point arrays, stacked two dimensional arrays, vertical bit line arrays, and the like.

One example of a ReRAM, or PCMRAM, cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse but includes a (continuous or non-continuous) vibration or burst of sound, current, voltage light, or other wave.

A person of ordinary skill in the art will recognize that the technology described herein is not limited to a single specific memory structure, but covers many relevant memory structures within the spirit and scope of the technology as described herein and as understood by one of ordinary skill in the art.

As discussed above, in one embodiment the interface 130 between the memory system 100 and the host 120 is NVMe over PCIe. NVMe is an interface that allows host software to communicate with a non-volatile memory system. This interface is optimized for Enterprise and Client solid state drives, typically attached as a register level interface to the PCIe interface. The register interface and command set are specified apart from any usage model for the non-volatile memory system, but rather only specifies the communication interface to the non-volatile memory system. Thus, this specification does not specify whether the non-volatile memory system is used as a solid state drive, a main memory, a cache memory, a backup memory, a redundant memory, etc. (any of which can be implemented for memory system 100).

The NVMe interface provides submission and completion queues that are used for the host to submit commands and the memory system to provide an indication of the outcome from executing the submitted commands. An NVMe command (e.g. Read or Write) is initiated at the host and sent to a particular submission queue that lives in host memory. Once the command is inserted into a queue, the host writes to a per-queue doorbell register on the controller. This doorbell write wakes up the controller, which then probes the queue for the new request(s). It reads the queue entry, executes the command and finally appends a completion into a completion queue then notifies the host of this via an interrupt. The host wakes up, pops that completion off the queue and returns results to the user.

There are two main types of queues that are used: Administrative Queues and I/O Queues. Administrative Queues are used for configuring and managing various aspects of the controller. There is only one pair of Administrative queues per controller. I/O Queues are used to move NVMe protocol specific commands (e.g. Read, Write). There can be up to 64K I/O queues per controller. In some embodiments, there is one pair of I/O queues per processor core; however, processor cores can have more than on pair of I/O queues and/or the number of I/O queues can be unrelated to the number of processor cores. Each queue pair includes a submission queue and a completion queue. All of the queues reside in host memory.

A submission queue (SQ) is a circular buffer with a fixed slot size that the host software uses to submit commands for execution by the controller. Each submission queue entry is a command. Commands are 64 bytes in size.

A completion queue (CQ) is a circular buffer with a fixed slot size used to post status for completed commands. A completed command is uniquely identified by a combination of the associated SQ identifier and command identifier that is assigned by host software. Multiple submission queues may be associated with a single completion queue. This feature may be used where a single worker thread processes all command completions via one completion queue even when those commands originated from multiple submission queues. A Phase Tag (P) bit in each completion queue entry indicates whether the entry has been newly posted. This enables host software to determine whether the new entry was posted as part of the previous or current round of completion notifications. After reading and processing a completion queue entry, the controller inverts the Phase Tag bit for that entry.

Each of submission queues and completion queues have both head pointers and tail pointers. The tail pointer points to the next available entry to add an entry into the queue. After the producer adds an entry to a queue, the producer increments the tail pointer (taking into consideration that once it gets to the end of the queue, it will wrap back to zero—they are all circular queues.) The queue is considered empty if the head and tail pointers are equal. The consumer uses the head pointer to determine where to start reading from the queue, after examining the tail pointer and determining that the queue is non-empty. The consumer will increment the head pointer after reading each entry.

The submission queue's tail pointer is managed by the host. After one or more entries have been pushed into the queue, the tail pointer (that was incremented) is written to the controller via a submission queue doorbell register residing on the controller. The controller maintains the head pointer and begins to read the queue once notified of the tail pointer update. It can continue to read the queue until empty.

As it consumes entries, the head pointer is updated, and sent back to the host via completion queue entries.

The completion queue's tail is managed by the controller, but unlike the host, the controller only maintains a private copy of the tail pointer. The only indication that there is a new completion queue entry is the Phase Tag bit in the completion queue entry that can be polled. Once the host determines an entry is available, it will read that entry and update the head pointer. The controller is notified of head pointer updates by host writes to the completion queue doorbell register.

Note that all work done by an NVMe controller is either pulled into or pushed out of that controller by the controller itself. The host merely places work into host memory and rings the doorbell ("you've got a submission entry to handle"). Later it collects results from the completion queue, again ringing the doorbell ("I'm done with these completion entries"). So the controller is free to work in parallel with the host. There is no requirement for ordering of completions—the controller can order its work anyway it chooses.

Figure 6:
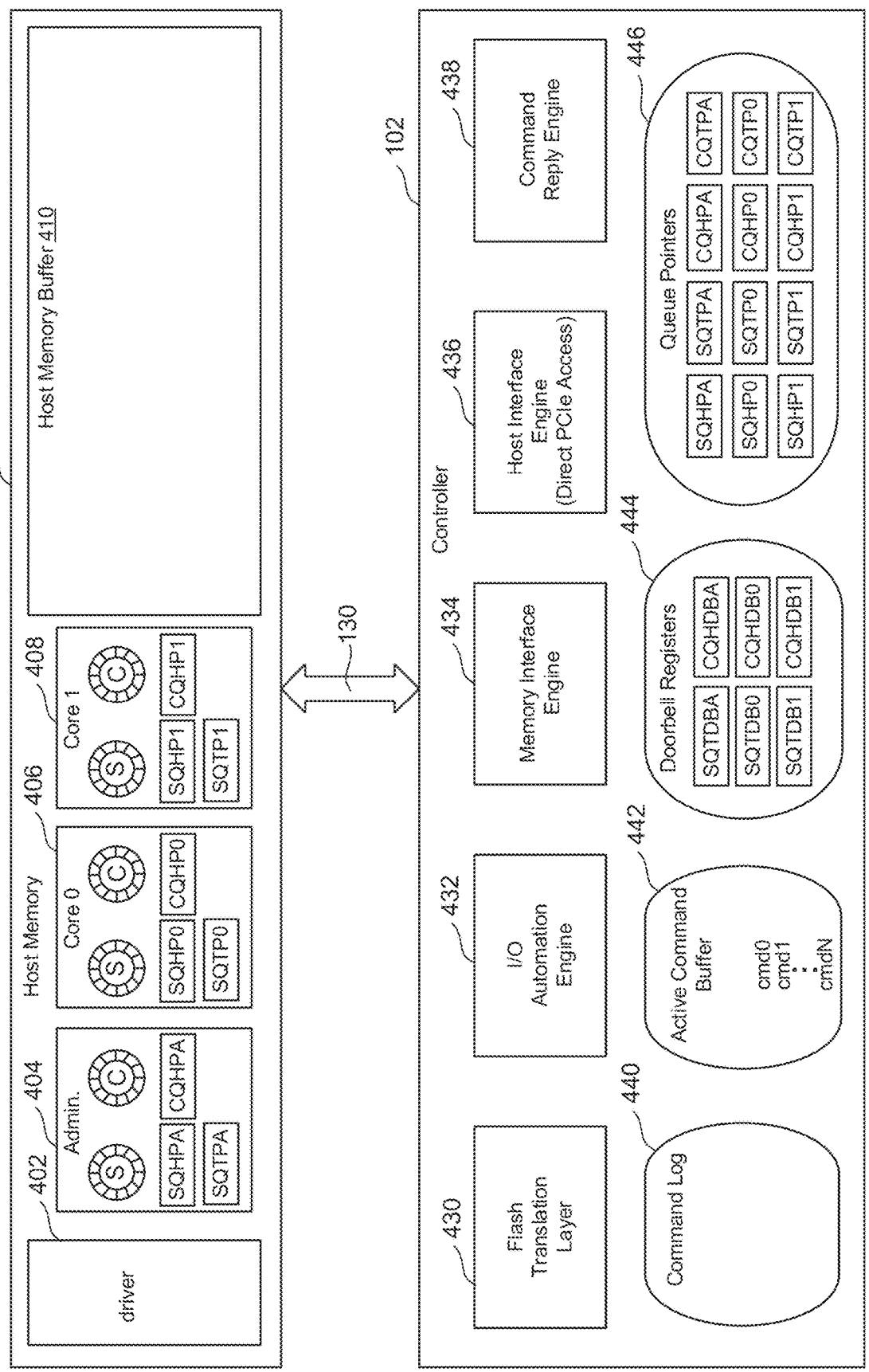
FIG. 6 is a logical block diagram of one embodiment of a Controller interfacing with a host.

FIG. 6 is a logical block diagram of the components of Controller 102 and the components residing in Host Memory 124 that are used to implement one embodiment of an NVMe over PCIe interface, interface 130, between memory system 100 and host 120. In one embodiment the host's physical memory (Host Memory 124) includes driver 402, data structure 404 for administrative commands, data structure 406 for Core 0, data structure 408 for Core 1, and Host Memory Buffer 410. Driver 402 is software on host 120 that interfaces with memory system 100. Data structure 404 includes the submission queue (S) and the completion queue (C) for administrative commands, and includes the submission queue head pointer (SQHPA), submission queue tail pointer (SQTPA), and the completion queue head pointer (CQHPA). In one embodiment, the system will maintain separate sets of queues for each Core. FIG. 6 shows sets of queues for two cores (Core 0 and Core 1); however, in other embodiments more or less than two cores can be implemented. The technology described herein is not limited to any number of cores. In other sets of embodiments, there can be a set of submission and completion queues for each thread. In some embodiments, a single core can have multiple sets of submission and completion queues. In the example of FIG. 6, there is a submission queue (S) and a completion queue (C) for Core 0 and a submission queue (S) and a completion queue (C) for Core 1. For example, data structure 406 includes the submission queue (S), completion queue (C), submission queue head pointer (SQHP0), submission queue tail pointer (SQTP0) and completion queue head pointer (CQHP0), all for Core 0. Data structure 408 includes the submission queue (S), completion queue (C), submission queue head pointer (SQHP1), submission queue tail pointer (SQTP1) and completion queue head pointer (CQHP1), all for Core 1. Host Memory Buffer 410 is a portion of Host Memory 124 that can be allocated (upon request from Controller 102) to be used by Controller 102.

FIG. 6 shows Controller 102 including five software modules, each representing processes running on Controller 102: Flash Translation Layer 430, I/O Automation Engine 432, Memory Interface Engine 434, Host Interface Engine 436 (direct PCIE access), and Command Replay Engine 438. Flash Translation Layer 430 translates between logical addresses used by Host 120 and physical addresses used by the various memory die within memory system 100. I/O Automation Engine 432 accesses the various commands in the submission queue, executes those commands, and returns results in the completion queues. Memory Interface Engine 434 manages the interface between Controller 102 and the various memory packages of non-volatile memory 104. For example, Memory Interface Engine 434 may be implemented on processors 220 and 250 (see FIG. 3). Host Interface Engine 436 implements the interface between Controller 102 and Host 120. For example, Host Interface Engine 436 can be running on Host Processor 152 (see FIG. 2). Command Replay Engine 438 is used to replay or re-execute a sequence of commands, as discussed below. In one embodiment, Flash Translation Layer 430, I/O Automation Engine 432 and Command Replay Engine 438 are performed/implemented by memory processor 156 (see FIG. 2). In other embodiments, other architectures for Controller 102 can be used so that other processors or groups of processors can be used to implement the software modules 430-438.

FIG. 6 also shows Controller 102 having four sets of data: Command Log 440, Active Command Buffer 442, Doorbell Registers 444 and Queue Pointers 446. In one embodiment, sets of data 440, 442, 444 and 446 are stored in the local memory for Controller 102 (e.g. DRAM 106 of FIG. 1). Command Log 440 stores copies of a sequence of commands and associated timing information for those commands so that those commands can be replayed or re-executed at a later time. Active Command Buffer 442 stores the commands that have been accessed from the various submission queues and that are in line to be executed by Controller 102. Doorbell Registers 444 are a set of registers that are operated as doorbells. As discussed above, when host 120 adds an entry to a submission queue or consumes an entry on a completion queue it will ring an appropriate doorbell by writing the updated pointer to that doorbell. Thus, FIG. 6 shows Doorbell Registers 444 including the Submission Queue Tail Doorbell for the administrative queues (SQTDBA), the Completion Queue Head Doorbell for the administration queues (CQHDBA), the Submission Queue Tail Doorbell for Core 0 (SQTDB0), the Completion Queue Head Doorbell for Core 0 (CQHDB0), Submission Queue Tail Doorbell for Core 1 (SQTDB1), and the Completion Queue Head Doorbell for Core 1 (CQHDB1).

Queue Pointers 446 include the head and tail pointers for the various sets of queues discussed above. In one embodiment, Controller 102 maintains a copy of the head and tail pointer for each queue. In the example of FIG. 6 there are six queues; therefore, Controller 102 stores six head pointers and six tail pointers. For example, FIG. 6 shows Queue Pointers 446 including the Submission Queue Head Pointer for the administrative queues (SQHPA), Submission Queue Tail Pointer for the administrative queues (SQTPA), the Completion Queue Head Pointer for the administration queues (CQHPA), the Completion Queue Tail Pointer for the administrative queues (CQTPA), the Submission Queue Head Pointer for Core 0 (SQHP0), the Submission Queue Tail Pointer for Core 0 (SQTP0), the Completion Queue Head Pointer for Core 0 (CQHP0), the Completion Queue Tail Pointer for Core 0 (CQTP0), the Submission Queue Head Pointer for Core 1 (SQHP1), the Submission Queue Tail Pointer for Core 1 (SQTP1), the Completion Queue Head Pointer for Core 1 (CQHP1), and the Completion Queue Tail Pointer for Core 1 (CQTP1). In other embodiments, the submission queues and completion queues can be replaced by other types of data structures. Any or all of the pointers in Queue Pointers 446 can be the command pointer of step 604.

Figure 7:
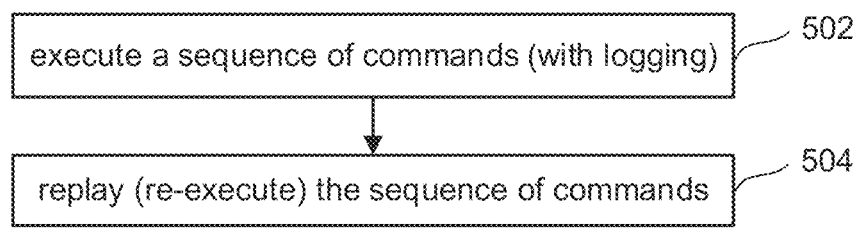
FIG. 7 is a flow chart describing one embodiment of a process for operating a memory system.

In some cases, a host may send a sequence of commands that is likely to be re-sent by the host at a later time, for example, a sequence of commands sent during a first host startup routine (host startup sequence) may be re-sent during a second host startup routine. In order to save time during a startup routine, a memory system such as memory system 100 may be configured to replay (or re-execute) the sequence of commands in response to an indicator from the host. Thus, the sequence of commands may not need to be re-sent and may be replayed instead, saving time, and simplifying interactions between a host and memory system during the host startup routine. FIG. 7 is a high level flow chart describing such a process. In step 502 of FIG. 7, Controller 102 executes a sequence of commands. In one embodiment, Controller 102 performs logging of the commands concurrently with executing the commands. For example, Controller 102 can be configured to receive a set of commands from a data structure in host memory and execute those commands, such as executing commands from a submission queue for one of the cores of the host processor. After executing the commands, the controller is configured to replay (or re-execute) the same sequence of commands in step 504 by writing the sequence of commands to volatile or non-volatile memory and subsequently reading the commands from volatile or non-volatile memory and executing the commands against data structures in host memory.

Figure 8:
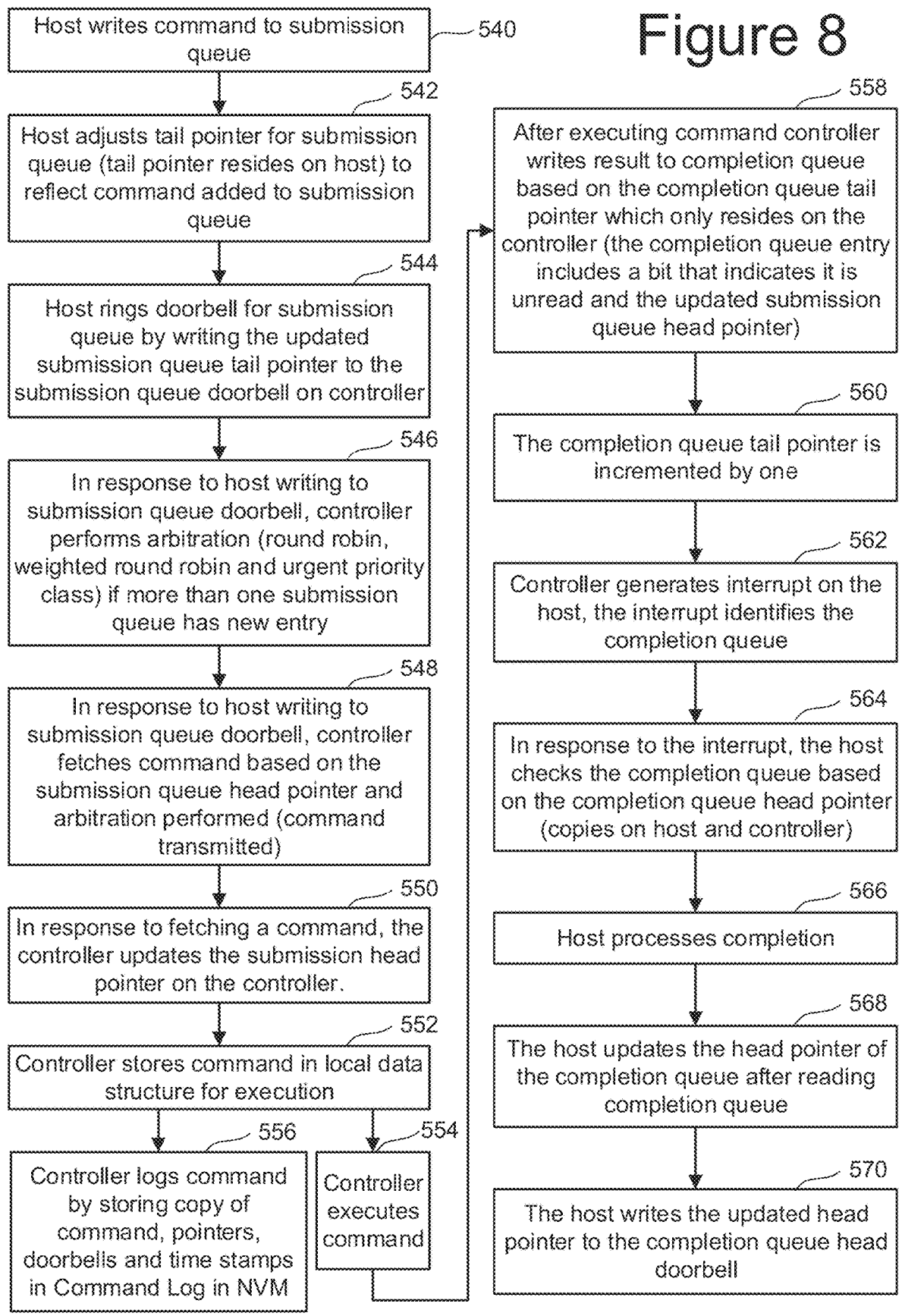
FIG. 8 is a flow chart describing one embodiment of a process for executing and logging a sequence of commands.

FIG. 8 is a flowchart describing one embodiment of a process of executing a sequence of commands, including logging those commands. That is, the process of FIG. 8 is one example implementation of step 502 of FIG. 7. In step 540 of FIG. 8, Host 120 writes a command to a Submission Queue. For example, host 120 can add a command to the Submission Queue (S) for Core 0. In step 542, host 120 adjusts the Tail Pointer for the Submission Queue to reflect the command added to the Submission Queue. For example, host 120 will update SQTP0 (see FIG. 6). In step 544, host 120 rings the doorbell for the Submission Queue by writing the updated Submission Queue Tail Pointer (SQTP0) to the Submission Queue Tail Doorbell (SQTDB) on Controller 102. In response to the host writing to the Submission Queue Tail Doorbell (SQTDB), Controller 102 performs arbitration if there is more than one Submission Queue with a new entry. There are multiple types of arbitration that can be performed. Three suitable examples include round robin arbitration, weighted round robin with urgent priority class arbitration, and vendor-specific arbitration; however, other types of arbitration can also be performed. In the general sense, arbitration is choosing which queue to obtain the next command from. In response to the host writing to the Submission Queue Tail Doorbell and in response to the arbitration, Controller 102 fetches the next command based on the value of the Submission Queue Head Pointer (SQHP0) and the arbitration performed in step 546. In step 550, in response to fetching the command, Controller 102 updates the Submission Head Pointer (SQHP0) on Controller 102. The Submission Head Pointer (SQHP0) will be sent back to the host via the Completion Queue, as discussed below. In this manner, both Controller 102 and Host 120 maintain copies of the Submission Queue Head Pointer (SQHP0) and the Submission Queue Tail Pointer (SQTP0). In step 552, Controller 102 stores the fetched command in the Active Command Buffer 442.

In step 554, Controller 102 executes the next command in Active Command Buffer 442. If logging is turned on, Controller 102 performs logging of the command in step 556 concurrently with the execution of the command in step 554. The logging includes storing a copy of the command, the pointers, the doorbells and a time stamp (or other timing information) in non-volatile memory (NVM). Command Log 440 may be a non-volatile memory, or data in command log 440 may be copied to a memory such as non-volatile memory 104. Note in some embodiments, steps 540-552 are performed in a loop that is separate from and concurrent to steps 554 and 556.

In step 558, after executing the command, Controller 102 writes the results to the appropriate completion queue based on the Completion Queue Tail Pointer which only resides on the Controller 102. In this example, Controller 102 uses Completion Queue Tail Pointer CQTP0 to write in the completion queue (C) for Core 0. The Completion Queue entry added in step 558 includes the updated Submission Queue Head Pointer (SQHP0). In step 560, the Completion Queue Tail Pointer (CQTP0) is incremented. In step 562, Controller 102 generates an interrupt on Host 120. The interrupt identifies the appropriate Completion Queue that has been updated. In step 564, in response to the interrupt, Host 120 checks the appropriate Completion Queue at the entry pointed to by the Completion Queue Head Pointer. In step 566, host 120 processes the Completion Queue entry. In step 568, Host 120 updates the Completion Queue Head Pointer (CQHP0). In step 570, Host 120 writes the updated Completion Queue Head Pointer (CQHP0) to the Completion Queue Head Doorbell on the controller (CQHDB0). As long as there are commands in the Active Command Buffer 442, steps 554-570 will continuously be performed. Each time the host writes a command to Submission Queue steps 540-552 will be performed.

Figure 9:
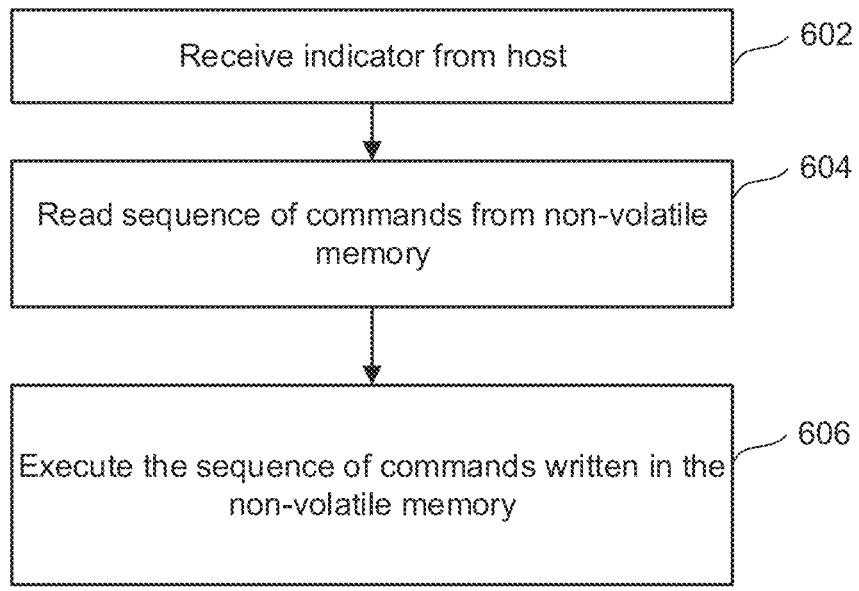
FIG. 9 is a flow chart describing one embodiment of a process for replaying (or re-executing) a sequence of commands.

FIG. 9 is a flowchart describing one embodiment of a process for replaying (or re-executing) the sequence of commands. That is, the process of FIG. 9 is one example implementation of step 504 of FIG. 7. In step 602 of FIG. 9, Controller 102 receives an indicator from host 120. The indicator acts as an instruction to Controller 102 that it is to replay the sequence of commands previously stored in non-volatile memory. In response to receiving the indicator from the host, controller 102 reads the sequence of commands from the non-volatile memory in step 604. While controller 102 reads the sequence of commands from the non-volatile memory in response to the indicator from the host in this example, in other examples, a sequence of commands may be read from non-volatile memory and loaded into volatile memory prior to receipt of the indicator from the host so that the steps may not occur in the order shown in FIG. 9. Controller 102 then executes the sequence of commands written in the non-volatile memory in step 606. Thus, by sending a single indicator, a host can cause controller 102 to replay a previously executed and recorded sequence of commands. For example, Controller 102 may be configured to receive the set of commands, execute the set of commands, and write the set of commands in the non-volatile memory during a first host startup sequence and to execute the set of commands from the non-volatile memory during a second host startup sequence. The sequence of commands does not have to be re-sent from the host to Controller 102 during the second host startup sequence. Thus, Controller 102 may be configured to receive the set of commands from the host through interface 130 during the first host startup sequence and to subsequently execute the set of commands from the non-volatile memory during the second host startup sequence without receiving the set of commands from the host through interface 130 during the second host startup sequence.

FIG. 10 is a flowchart describing one embodiment for replaying (or re-executing) a sequence of commands. The process of FIG. 10 provides a more detailed implementation of the process of FIG. 9, and also represents an example embodiment of step 504 of FIG. 7. In step 1000, Controller 102 receives a host write to a register that is configured as a dedicated register in which the host indicates that a sequence of commands is to be replayed. In step 1002, Controller 102 detects the indicator written by the host in the register, e.g. controller 102 reads an indicator from the register and detects which sequence of commands corresponds to the indicator (there may be more than one sequences of commands written in non-volatile memory). Different indicators may be used to indicate replay of different sequences of commands. For example, each indicator may be a unique number that corresponds to a sequence of commands. In step 1006, Controller 102 reads a sequence of commands from non-volatile memory 104 at the location corresponding to the indicator written in the register. In step 1008, Controller 102 writes the sequence of commands to active command buffer 442. In step 1010, Controller 102 executes the commands in active buffer 442. In contrast to the individual execution of commands illustrated in FIG. 8, here commands are not individually fetched from a submission queue in the host for execution, which simplifies interactions between the host and memory system. For example, while FIG. 8 shows multiple steps leading up to the controller storing command in local data structure for execution in step 552, in FIG. 10, a sequence of commands is read from non-volatile memory and written into the local data structure for execution without the series of interactions shown in FIG. 8.

In general, in a process such as shown in FIG. 10, when a host sends an indicator to a memory system to cause the memory system to replay a set of commands including read commands, the host allocates addresses in host memory accordingly. For example, some addresses may be allocated for transfer of data from the memory system to the host in response to one or more read commands. When the memory system replays logged read commands from a host, it sends data read from the same addresses in non-volatile memory to the same addresses in host memory as in the logged startup sequence. Thus, it is important that the same addresses in host memory are available to the memory system each time the set of commands is replayed and that the memory system does not overwrite any other data in host memory when it replays a set of commands. Configuring host memory to accommodate a replayed sequence of commands may require moving data in host memory to make the same addresses available to the memory system as were used when the commands were logged. This may create a burden on the host and there may be some risk of overwriting host data.

According to an example of the present technology, a host may allocate addresses in a Host Memory Buffer (HMB) such as Host Memory Buffer 410 for use by a memory controller when replaying a set of commands such as a set of commands associated with a host startup sequence. The memory system may then write command structures and read payloads in the HMB, which may simplify memory allocation, reduce risk of overwriting host data, and allow reuse of such addresses by the memory system.

FIG. 11A illustrates an example of a fixed structures 2160 stored in Host Memory Buffer 2162 in a host memory (e.g. Host Memory Buffer 410 in host memory 124). Fixed structure 2160 may be used during replay of a sequence of commands as shown in FIG. 10, including providing a destination for payloads of read commands. Fixed structure 2160 includes an Admin Submission Queue (ASQ), an Admin Completion Queue (ACQ), Completion Queues (CQs), and Submission Queues (CQs). Fixed structure 2160 further includes Physical Region Pages (PRPs) to read payload targets 2164 and Initial read payload targets 2166. PRP to read payload targets 2164 may include pointers to ranges of addresses that may be used for I/O commands including initial read commands, e.g. pointers to locations in HMB 2162 including locations for initial read payload targets 2166. Alternatively, PRP 2164 may be implied rather than explicitly stored, since the target address range is known to the controller. Initial read payload targets 2166 may be allocated as destination addresses for the memory system to place data that is read from source addresses in the non-volatile memory in response to logged read commands (e.g. initial read commands of a host startup sequence).

Figure 11B:
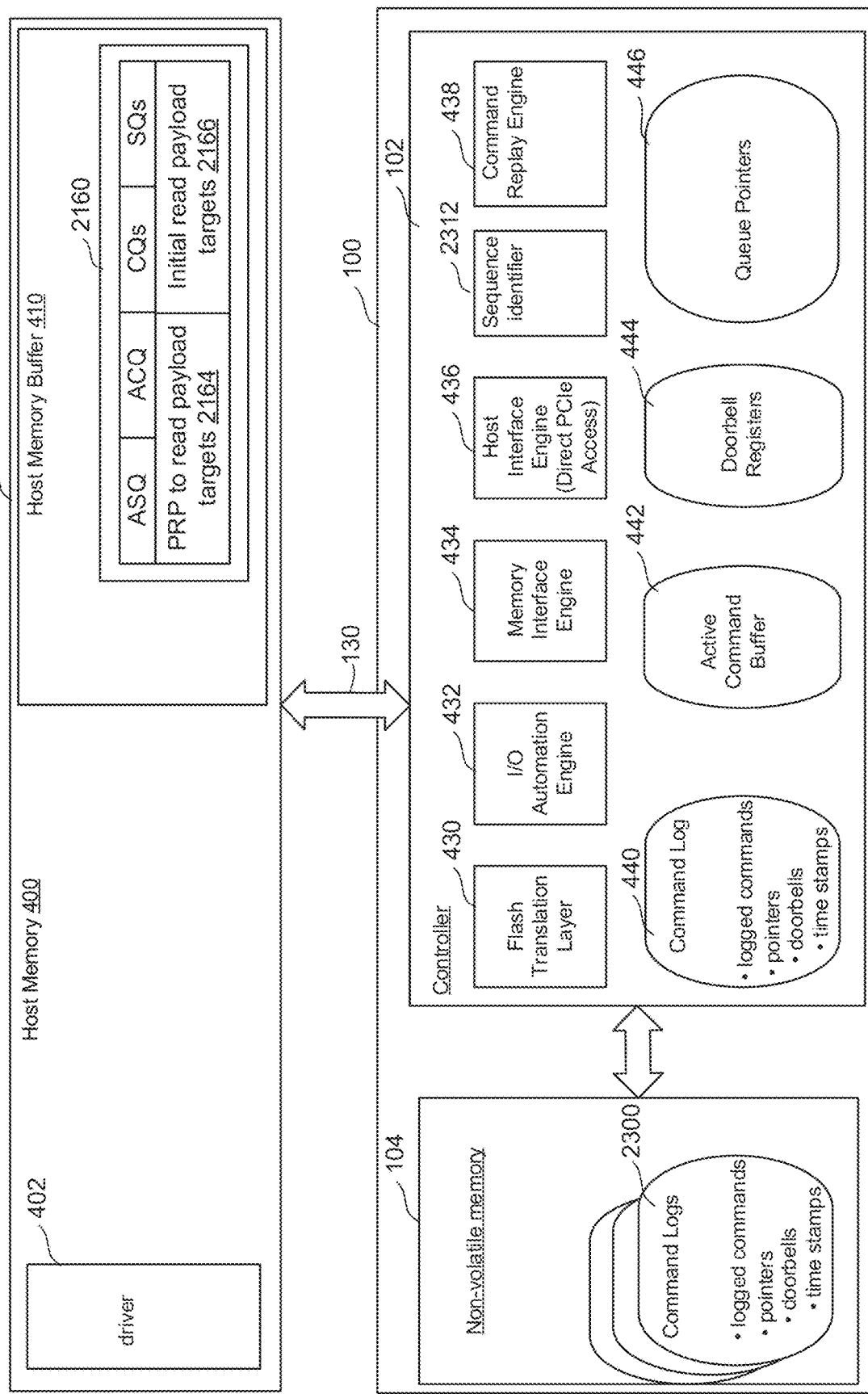

FIG. 11B illustrates example configurations of host memory 124 and memory system 100 and illustrates how hardware similar to that shown in FIG. 6 may be configured to implement the process of FIG. 7 as further illustrated in examples of FIGS. 9 and 10 and further using a HMB to store a fixed structure as illustrated in FIG. 11A. FIG. 11B shows non-volatile memory 104 containing command logs 2300, which may include one or more sets of commands including logged commands, pointers, doorbells, and/or time stamps that may be replayed as illustrated in the examples of FIGS. 9 and 10. For example, one or more sets of commands logged in command log 440 (e.g. commands associated with one or more host startup sequence) may be written in non-volatile memory 104. Command Replay Engine 438 may be configured to replay a set of commands from command log 440, and/or command logs 2300. Sequence identifier 2312 is configured to identify a corresponding sequence of commands (e.g. sequence of commands in command logs 2300) from an indicator sent by a host. This may be considered an example of performing step 1002 of FIG. 10. For example, sequence identifier 2312 may respond to a host write to a dedicated register by reading the register to obtain a unique number sent by the host and may identify a corresponding sequence of commands from a table or other structure linking indicators with sequences of commands. Replay Engine 438 may replay commands from command logs 2300 for host startup sequences, for example, by performing steps 1006, 1008 and 1010 of the process of FIG. 10. Host Memory Buffer 410 is shown containing fixed structures 2160, which may be used by memory system 100 when replaying a set of commands, e.g. transferring initial read payload targets from source addresses in non-volatile memory 104 to destination addresses in fixed structure 2160 in host memory 400. While the example of FIG. 11B shows fixed structure 2160 located in HMB 410 of host memory 400, in other examples, data structures in host memory 400 may be located elsewhere (outside HMB 410) and may be assigned different locations rather than being fixed.

FIG. 12 shows an example of a host startup sequence that includes replaying a logged set of commands from a previous host startup sequence using a fixed structure in a HMB (e.g. fixed structure 2160 in HMB 410 of FIG. 11B). FIG. 12 may be considered an example of the process of FIG. 10 and of configuration used to facilitate that process using HMB. In step 2280, a host writes a Config Register with location and size of a target HMB. This informs a memory system of basic information about the HMB so that it can access the HMB. In step 2282, the memory system initializes Admin Submission Queue (ASQ) and Admin Completion Queue (ACQ) based on the structure to be stored in the HMB. In step 2284, the memory system plays back config register changes and enables the device (i.e. the memory system plays back config register changes that were previously logged in a command sequence). In step 2286, the memory system plays back initial admin commands using HMB as a target for payloads and in step 2288, the memory system plays back I/O commands and may also use the HMB as a target for payloads (e.g. storing initial payload targets in HMB 2160). In step 2230, the memory system notifies the host of sequence completion.

Figure 13:
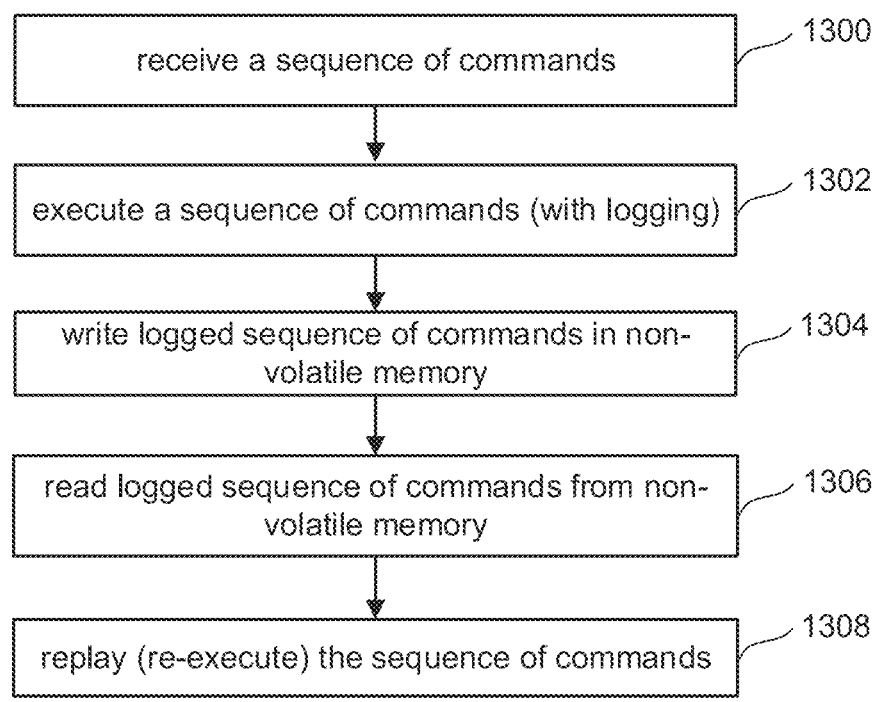
FIG. 13 shows an example that includes replaying a sequence of commands from non-volatile memory.

An example implementation of the process of FIG. 7 is shown in FIG. 13 including logging a sequence of commands as illustrated in FIG. 8 and replaying of a sequence of commands as illustrated in FIGS. 9 and 10. The process of FIG. 13 may be implemented using components illustrated in FIG. 11B. In this example, non-volatile memory is used to store a logged sequence of commands for use at some later time (e.g. storing a set of commands associated with a first host startup routine for subsequent use in a second host startup routine in a non-volatile memory such as non-volatile memory 104 of FIG. 11B). In step 1300, a memory system such as memory system 100 receives a sequence of commands. The sequence of commands may be received from a host such as host 120 and may include read commands associated with a host startup routine of host 120. In step 1302, the sequence of commands is executed (with logging). Execution of the sequence of commands may include some interaction between the host and the memory system including, for example, interactions associated with initiating communication through an NVMe over PCIe interface such as interface 130 and read commands from the host directed to obtaining data from non-volatile memory that is needed for host startup. An example of interactions between a host and non-volatile memory during execution of a command with logging is illustrated in FIG. 8. Logging may be performed as described above with respect to FIG. 8, e.g. by storing logged commands, pointers, doorbells, time stamps and/or other structures in a command log such as command log 440 of controller 102. In step 1304, the logged sequence of commands is written in non-volatile memory. For example, a copy of command log 440 may be written from controller 102 to a non-volatile memory such as non-volatile memory 104 (e.g. to some non-volatile memory that is external to a memory controller and may be coupled to the memory controller through a memory interface). In some cases, logging and writing in non-volatile memory may be combined (i.e. logging of step 103 may be combined with writing of step 1304) so that no separate writing step is required. For example, command log 440 may be located in a non-volatile memory, which may be an internal non-volatile memory within controller 102 or may be an external non-volatile memory such as non-volatile memory 104. A sequence of commands written in non-volatile memory may be accessed at any subsequent time, for example, a sequence of commands related to a host startup routine may be accessed during one or more subsequent host startup routines. In step 1306, the logged sequence of commands is read from non-volatile memory (e.g. controller 102 may read a previously written sequence of commands from non-volatile memory 104 through a suitable memory interface such as TM interface 296). In step 1308, the sequence of commands is replayed (re-executed), e.g. as illustrated in FIGS. 9 and 10. Replaying a sequence of commands associated with a first host startup routine may facilitate a subsequent second host startup, for example, by executing host read commands directed to data stored in non-volatile memory that may be needed by the host for startup. Replaying a copy of such a sequence of commands stored in non-volatile memory may save time compared with a host resending each command of the sequence again, and the memory system responding individually to each command again. Thus, a second or subsequent host startup routine during which a memory system uses a replayed sequence of commands from non-volatile memory may be faster than a first host startup routine during which each command of such a sequence is sent by the host and responded to by the memory system.

It will be understood that not all sequences of commands, or all host startup sequences, may be logged (i.e. step 1302 may be implemented selectively) and that logging of sequences of commands may be limited to particular sequences of commands that are likely to be called for again. Some hosts may not implement command sequence replay and a memory system that does not receive an indicator to log or replay a sequence of commands may proceed without logging or replaying (i.e. receiving and executing commands individually). While sequences of commands associated with host startup routines provide examples of such sequences, the present technology is not limited to host startup sequences and may be applied to any sequence of commands that is likely to be resent by a host.

Figure 14:
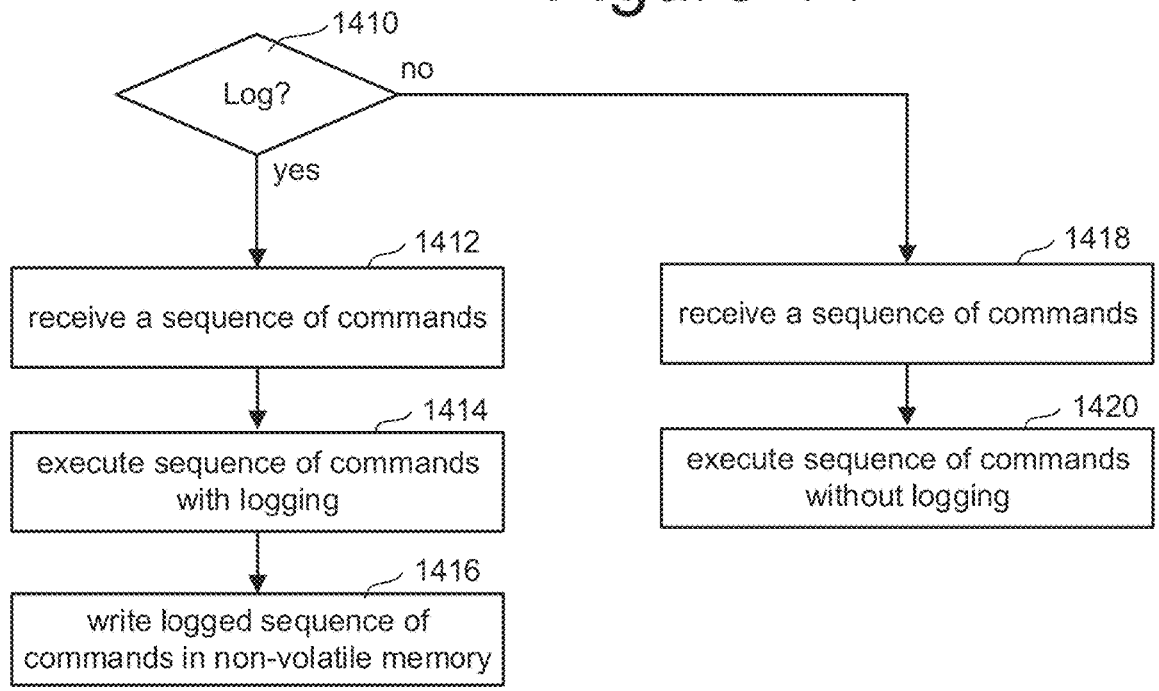
FIG. 14 shows examples of execution of a sequence of commands with and without logging.

FIG. 14 shows an example of a process for managing a sequence of commands, which may be logged as illustrated in FIG. 13 or 8, or not logged, according to a host input (i.e. some decision is made before performing logging of step 1302 of FIG. 13). The process of FIG. 14 may be implemented in a memory system that receives commands from a host and has capability for logging commands (e.g. may be implemented by controller 102 of memory system 100 receiving commands from host 120 as illustrated in FIG. 11B). For example, the process of FIG. 14 may be implemented during a host startup routine of host 120. A determination 1410 is made as to whether to log a sequence of commands. In general, the determination is based on an indicator from a host that tells a memory system to log, or not log, a sequence of commands. When a determination is made to log a sequence of commands, the memory system receives the sequence of commands 1412 and executes the sequence of commands with logging 1414 (similar to step 1302 of FIG. 13). The logged sequence of commands is written to non-volatile memory 1416 (e.g. by copying from log to non-volatile memory or by logging directly to non-volatile memory). Thus, a copy of the logged sequence of commands is subsequently available in this case. Where a determination is made not to log a sequence of commands, the memory system receives the sequence of commands 1418 and executes the sequence of commands without logging 1420.

Figure 15:
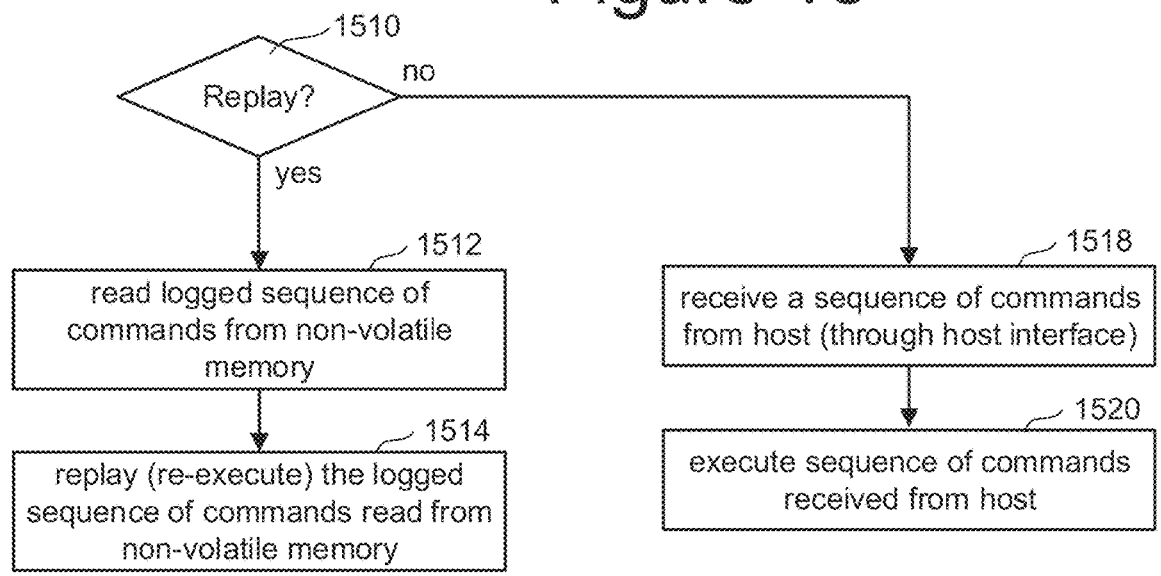
FIG. 15 shows examples of execution of a sequence of commands directly from a host or by replaying from non-volatile memory.

Not all startup routines may include replaying a sequence of commands as shown in step 1308 of FIG. 13 even where such a sequence is available. Some decision may be made prior to replaying a sequence of commands. FIG. 15 illustrates such a decision and outcomes. FIG. 15 shows an example of a process for executing a sequence of commands which may be implemented in a memory system that receives commands from a host and has capability for replaying logged commands (e.g. may be implemented by controller 102 of memory system 100 receiving commands from host 120). For example, the process of FIG. 15 may be implemented during a host startup routine of host 120 when logged commands are available for replaying. A determination 1510 is made as to whether to replay a sequence of commands. In general, the determination is based on an indicator from a host that tells a memory system to replay a sequence of commands. When a determination is made to replay a sequence of commands, the memory system reads the sequence of commands from non-volatile memory 1512 and replays (re-executes) the logged sequence of commands read from non-volatile memory in step 1514 (similar to steps 1306 and 1308 of FIG. 13). This may occur without the host resending the sequence of commands to the memory system. Where a determination is made not to replay a sequence of commands, the memory system receives the sequence of commands from the host (through the host interface) in step 1518 and executes the sequence of commands received from the host in step 1520. It will be understood that receipt and execution of commands of step 1518 and step 1520 may be interleaved and may include communication back and forth between host and memory system, which may incur some time delay compared with replay of logged commands of step 1514.

While the present technology may be applied to a range of different commands sent and received at different times over different interfaces, particular examples are described below with respect to sets of commands associated with host startup sequences, where a host accesses a memory system through an NVMe interface during its startup sequence. Logging and replaying such sets of commands may reduce the time required for such host startup sequence. However, the present technology is not limited to commands associated with host startup sequence and is not limited to NVMe interfaces.

Figure 16:
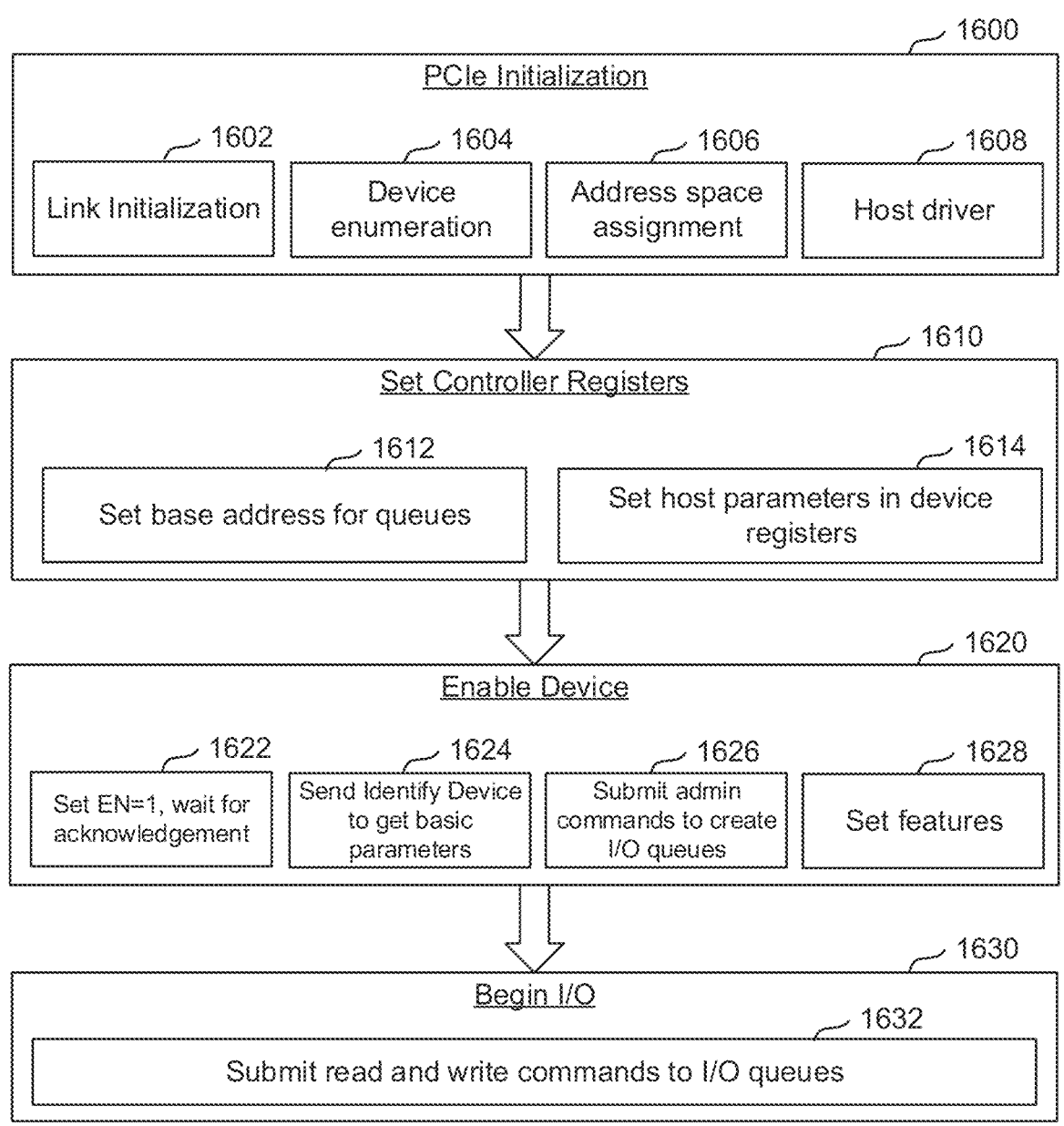
FIG. 16 illustrates an example of a host startup sequence.

FIG. 16 shows an example of certain aspects of interaction between a host and a memory system during a host startup routine (e.g. interaction between host 120 and memory system 100 during a host startup routine of host 120). In particular, FIG. 16 illustrates certain aspects of an Intel BIOS startup routine including a various host commands that may be logged and replayed as illustrated in FIG. 13 to facilitate faster host startup by replaying those commands. Interactions of FIG. 16 occur in four stages. In a first stage, PCIe Initialization 1600, the PCIe interface is initialized, which allows subsequent NVMe configuration. In PCIe Initialization 1600, the PCIe link is initialized 1602, which may include establishing the physical link between host and memory system (e.g. physical link of interface 130) including parameters such as link width, link data rate, etc. Device enumeration 1604 detects devices connected to the host through the PCIe interface (e.g. memory system 100 connected through interface 130). Address space assignment 1606 may include assigning host address space to any devices detected during device enumeration 1604. Host driver configuration 1608 may include initializing and configuring a PCIe driver in the host for communicating with one or more devices connected to a PCIe interface (e.g. initialization and configuration of driver 402). In a second stage, Set Controller Registers 1610, registers in a controller such as controller 102 are set, which includes sending commands to set a base address for queues 1612 and set host parameters in device registers 1614. In a third stage, Enable Device 1620, a memory system is enabled. This stage includes setting an enable register, (Set CC.EN=1), wait for acknowledgement 1622 (i.e. host may set enable and wait for a memory controller to respond when ready). The host then sends an Identify Device command to get basic parameters 1624. The memory system may respond to the host with the parameters. The host submits admin commands to create I/O queues 1626 (e.g. at least one I/O queue to allow basic I/O operation for startup purposes). The host sends a set features command 1628 to set features of the memory system. In a fourth stage, Begin I/O 1630, a host submits read and write commands to I/O queues 1632. This may include one or more read commands that are directed to obtaining host startup data (e.g. operating system data, boot loader data, and/or configuration data) from non-volatile memory so that the host can use such data as part of a host startup sequence (e.g. to load and configure an operating system). In some cases, when a host starts up, interactions illustrated in FIG. 16 may be repeated from a previous host startup routine, e.g. the same registers are configured, same parameters are sent, same I/O queues are created, and the same series of read commands are submitted.

Figure 17:
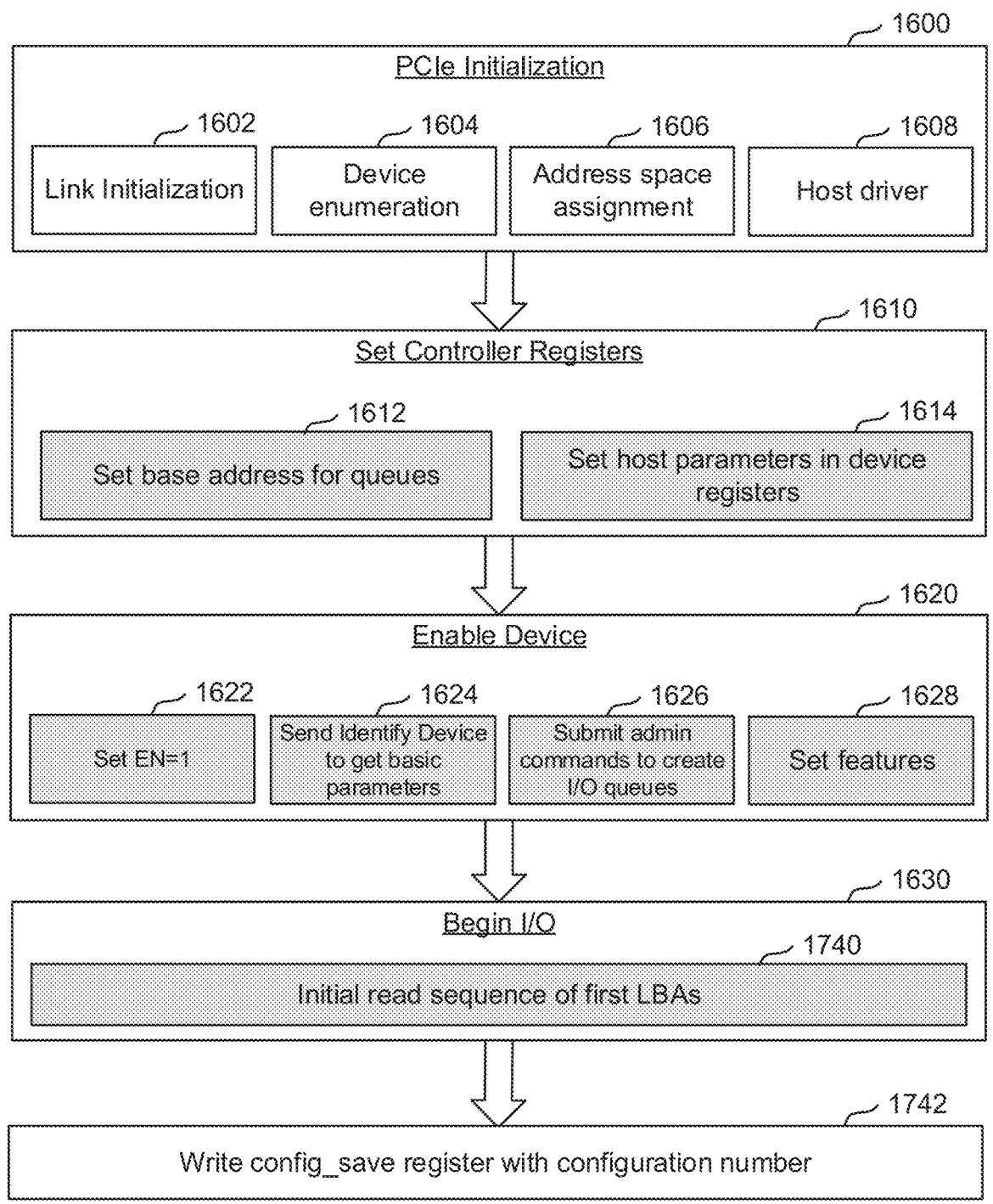
FIG. 17 illustrates an example of logging during a host startup sequence.

FIG. 17 illustrates an example of certain aspects of interaction between a host and a memory system during a host startup routine (e.g. interaction between host 120 and memory system 100 during a host startup routine of host 120) that includes logging of certain interactions to allow for subsequent replay. FIG. 17 may be considered an example of how logging of commands illustrated in FIG. 8 may be implemented in the Unified Extensible Firmware Interface (UEFI) startup routine of FIG. 16, including illustrating which commands may be logged. The host startup routine of FIG. 17 is the UEFI startup routine, however, it will be understood that the present technology is not limited to any particular host startup routine, or to any particular portions of a host startup routine. FIG. 17 illustrates the same series of stages of a host startup sequence as illustrated in FIG. 16, including PCIe Initialization 1600, Set Controller Registers 1610, Enable Device 1620, and Begin I/O 1630. In the example shown, interactions that are shaded are logged or recorded (e.g. in a log such as command log 440). This may include logging corresponding host commands sent from a host to a memory device (e.g. from host 120 to memory device 100) and pointers, doorbells, and/or time stamps associated with such commands. Logging of commands begins after PCIe initialization 1600 and may include some or all host-device interactions of Set Controller Registers 1610 (set base address for queues 1612 and/or set host parameters in device registers 1614) and Enable Device 1620 (Set EN=1 1622, send Identify Device to get basic parameters 1624, submit admin commands to create I/O queues 1626, and set features command 1628). In Begin I/O 1630, initial reads of Logical Block Addresses (LBAs) by the host, "Initial read sequence of first LBAs" of step 1740 are logged (i.e. logging extends past the initial boot sequence to include read commands directed to host startup data that may include operating system data). This may be a subset of read and write commands to I/O queues 1632 that includes only selected read commands that may be repeated in a subsequent host startup sequence. Write commands are not logged in this example, though in other examples write commands may also be logged. The specific commands to log, or not log, may be configured as required. A command log containing the logged interactions of FIG. 16 may be written to non-volatile memory by writing to a designated register, e.g. config_save register. Thus, write config_save register with configuration number 1742 indicates a register write of a copy of a command log to non-volatile memory along with a configuration number that is used to uniquely identify the copy of the command for subsequent access. Logging of interactions between a host and device may be performed by a host or device, or some combination (e.g. by host 120, memory device 100, or some combination). For example, a host may log commands as they are sent or executed and may subsequently issue a write command to a memory system to write a copy of the log in non-volatile memory, e.g. at a predetermined address range and/or using a unique identifier. A memory controller may log commands as they are received or executed (e.g. in Command log 440) and may write a copy of logged commands in non-volatile memory for subsequent access (or may log commands directly by writing them in non-volatile memory).

Figure 18:
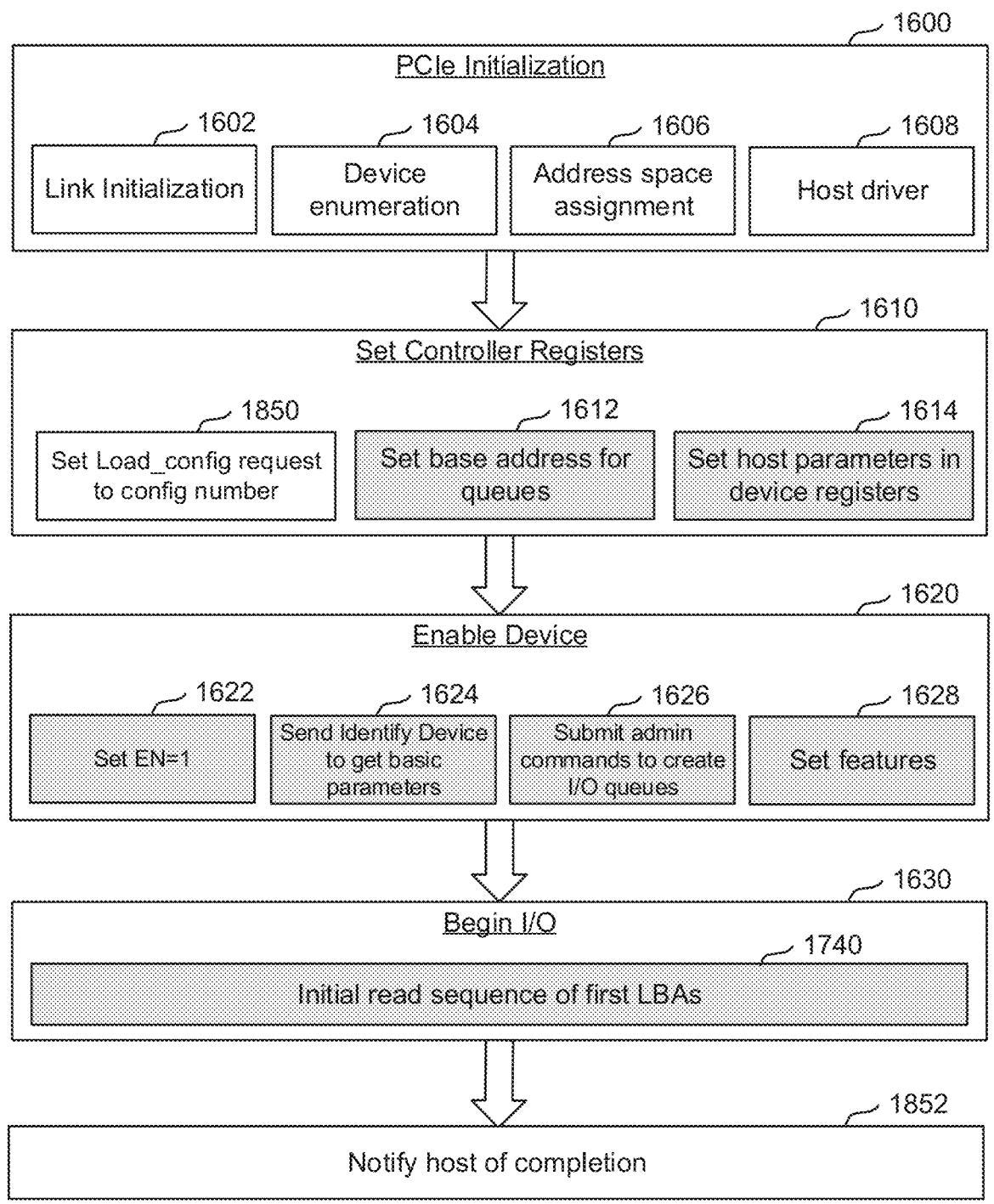
FIG. 18 illustrates an example of replaying during a host startup sequence.

After a sequence of commands is written in non-volatile memory it may be accessed and replayed (e.g. as shown in FIG. 10) to reproduce the same structures and transfer the same data as before. FIG. 18 shows an example in which the commands logged in FIG. 17 are replayed during a subsequent host startup sequence. Thus, FIG. 18 may be considered an example of how replaying of commands illustrated in FIG. 10 may be applied to the UEFI startup routine of FIG. 16, and specifically to the sequence of commands logged in FIG. 17. It will be understood that where a host sends an indicator to replay logged commands, the host may perform appropriate configuration of host memory, e.g. allocating the same memory ranges in host memory as used in the recorded startup sequence so that these ranges are available for use by the memory system. FIG. 18 uses the same reference numbers as FIGS. 16 and 17 to identify the same interactions. In the startup sequence of FIG. 18, after PCIe initialization 1600, the host sends an indicator to the device to indicate that the sequence of commands of FIG. 17 is to be replayed. Set Load_config request to config number 1850 is a PCIe register write that indicates the configuration number corresponding to the set of commands, i.e. configuration number of step 1742. In response, the device (e.g. memory system 100) reads the copy of the command log from non-volatile memory and replays the commands that were logged in FIG. 17 (indicated by shading in both FIGS. 17 and 18) including reading host startup data in the initial read sequence of first LBAs 1740. In other examples different commands may be logged and replayed, e.g. including write commands where a host configures payloads to be written prior to writing Set Load_config request to config number 1850. Subsequent to execution of the sequence of commands, the device notifies the host of completion 1852. Notification may be in the form of a register change or a completion interrupt, for example, using an admin completion queue (e.g. a Message Signaled Interrupt (MSI) or MSI extended (MSI-X) vector) or other such interrupt. Thus, in response to receiving an indicator from the host, the device executes the set of commands written in the non-volatile memory without requiring further commands from the host. This may allow rapid completion of shaded interactions because separate commands are not required, and interactions are simplified. Thus, the first host startup sequence of FIG. 17 may have a first startup time and the second host startup sequence of FIG. 18 may have a second host startup time that is less than the first host startup time.

Figure 19:
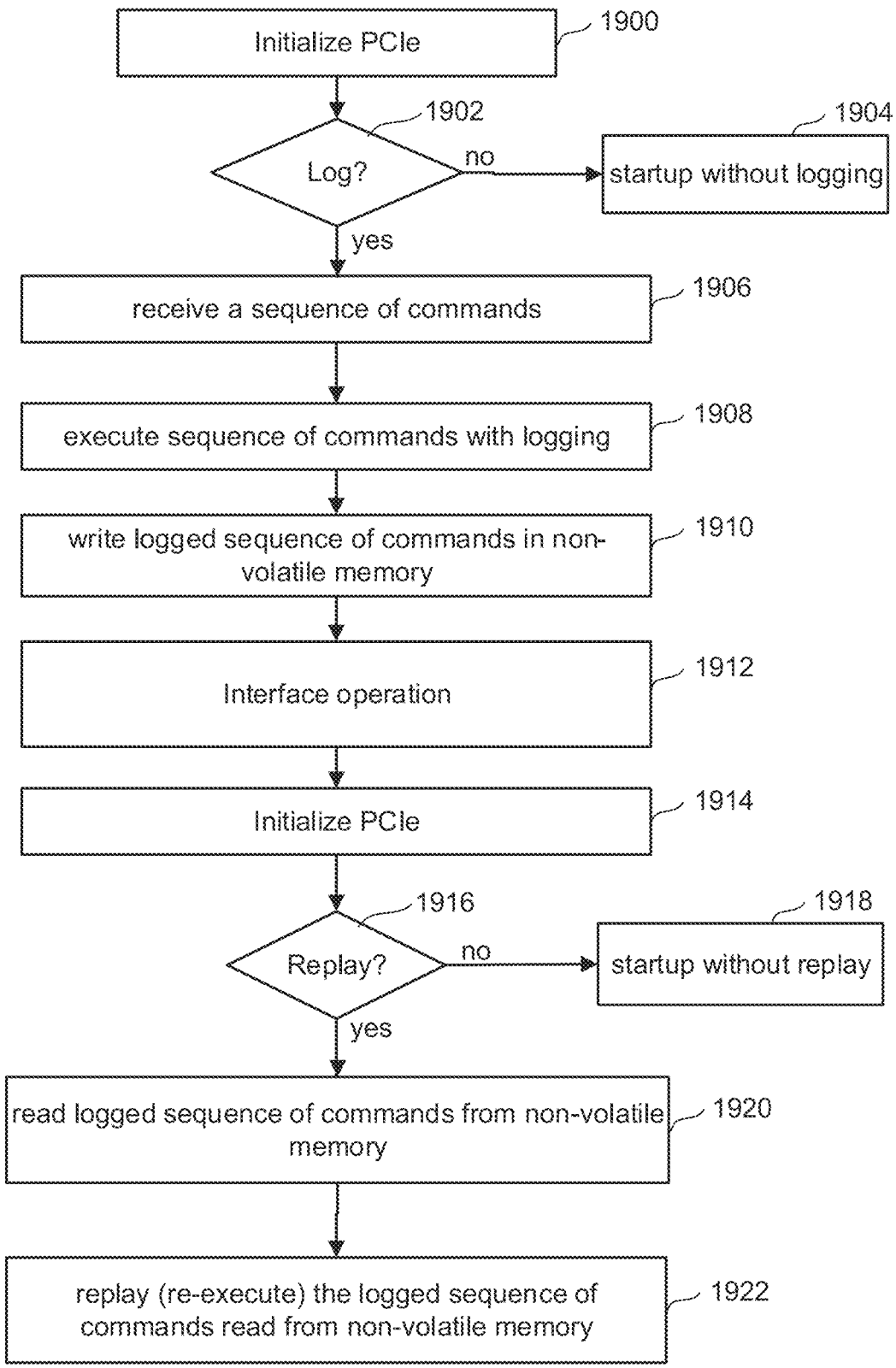
FIG. 19 illustrates an example of operation of a memory system that includes logging and replaying of a sequence of commands.

Logging and replaying of sequences of commands, including logging and replaying of host startup-related sequences of commands, may occur at different times that may be separated by significant periods of operation including, in some cases, one or more additional host startup sequences. FIG. 19 illustrates a period of operation of a memory system coupled to one or more hosts through an NVMe interface (e.g. host 120 coupled to memory system 100 through interface 130). FIG. 19 illustrates both logging of a sequence of commands (e.g. as illustrated in FIGS. 8 and 17) and alternatively not logging such commands (as illustrated in FIG. 14) and replaying a logged sequence of commands (e.g. as illustrated in FIGS. 10 and 18) and alternatively not replaying a logged sequence of commands (e.g. as illustrated in FIG. 15). After a first PCIe initialization 1900, controller 102 makes a determination 1902 as to whether to log commands (e.g. by determining if the host has sent an indicator that logging is to be performed). When a determination is made not to log commands, the host startup sequence proceeds without logging 1904. When a determination is made to log commands, the memory system receives a sequence of commands 1906, executes the sequence of commands with logging 1908, and writes the sequence of commands in non-volatile memory 1910. Subsequently, the host startup sequence may continue (i.e. there may be additional commands and interactions between the host and memory system related to the host startup sequence in addition to those that are logged). Interface operation 1912 (e.g. operation of an NVMe interface such as interface 130) may continue for some period of time while the logged sequence of commands remains in non-volatile memory. Interface operation 1912 may include one or more host startup sequences that may or may not include logging of additional sequences of commands. In a subsequent host startup sequence, after PCIe initialization 1914, a determination 1916 is made as to whether to replay a previously written sequence of commands. When it is determined that a sequence of commands is not to be replayed, the host startup routine proceeds without replay 1918. When it is determined that a sequence of commands is to be replayed, the memory system reads the logged sequence of commands from non-volatile memory 1920 and replays (re-executes) the logged sequence of commands from non-volatile memory 1922.

While the examples of FIGS. 17-19 refer to logging and replaying specific commands related to a specific host startup sequence, it will be understood that aspects of the present technology may be used at various stages of various host startup routines including, but not limited to BIOS startup, boot loader operation, and Operating System loading. Aspects of the present technology may be applied to systems in which host configurations are fixed from one host startup sequence to another so that identical commands may be used. For example, embedded hosts, such as a host in an automotive application or in a server may use the same host startup sequence repeatedly. As illustrated here, such a host startup sequence may be replayed, which may provide faster host startup. This may be achieved without hardcoding the startup sequence so that it may easily be updated by rerecording it.

The present technology is not limited to saving a single sequence of commands. Aspects of the present technology allow logging of two or more sequences of commands and writing of such sequences of commands to non-volatile memory so that they are subsequently available for replay. In some cases, a host may use different startup sequences at different times and may use different sequences of commands accordingly. Aspects of the present technology allow logging of different sequences of commands that may be used by a host and allows subsequent replay of those sequences of commands. For example, different sequences of commands may be saved with different identifiers or indicators, which may subsequently be used to identify a sequence of commands to be replayed.

Figure 20:
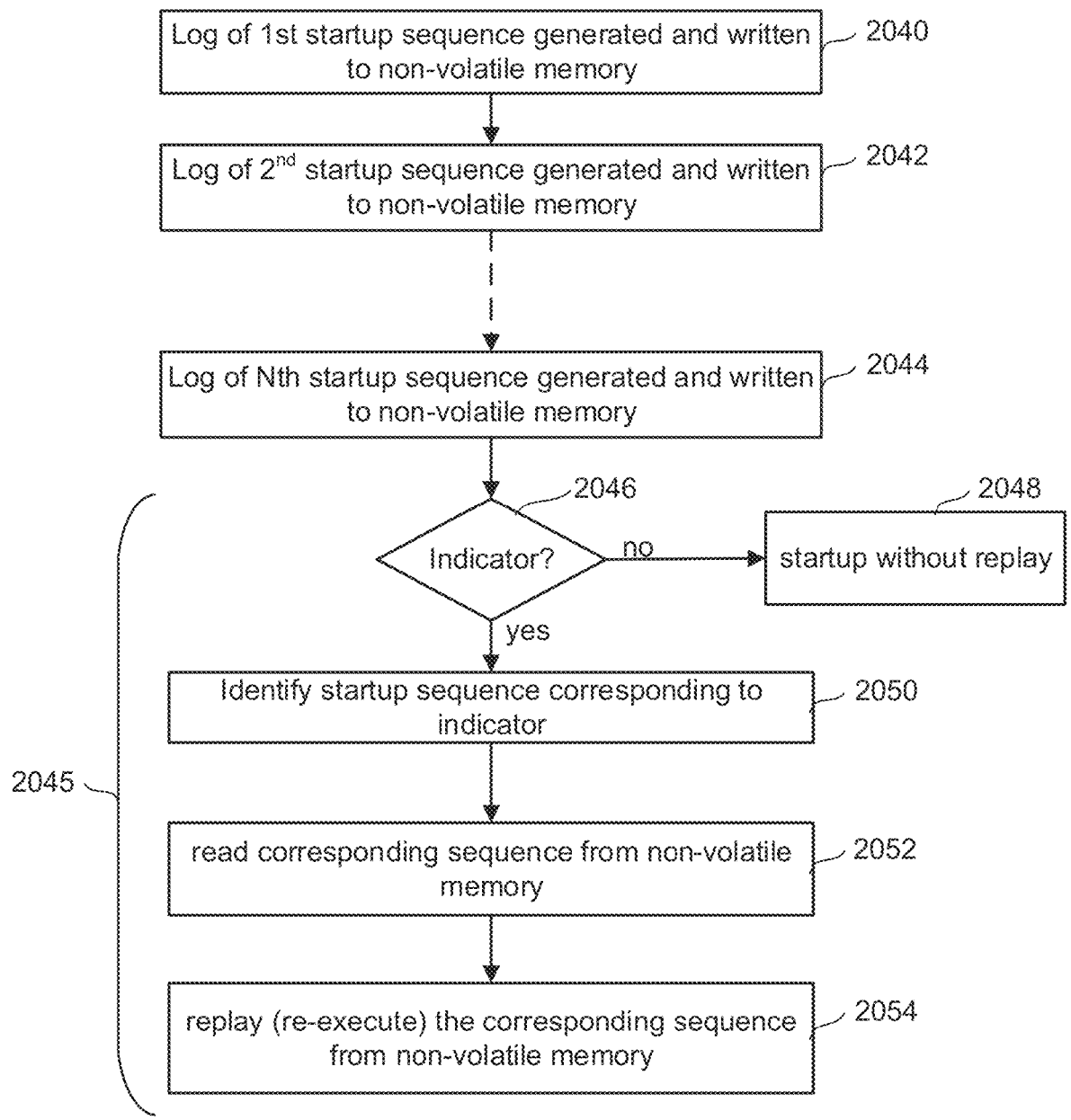
FIG. 20 illustrates an example of logging multiple host startup sequences and subsequently selecting and replaying a selected host startup sequence.

FIG. 20 shows an example that includes logging of multiple startup sequences (i.e. multiple sequences of commands associated with host startup sequences) for example by multiple instances of the process described in FIGS. 8 and 17. A log of a first startup sequence is generated and written to non-volatile memory in step 2040 (e.g. as illustrated in FIGS. 8 and 17), a log of a second startup sequence is generated and written to non-volatile memory in step 2042 (e.g. as illustrated in FIGS. 8 and 17), and so on to an Nth startup sequence (Log of Nth startup sequence generated and written to non-volatile memory in step 2044) where N may be any number selected. Logging of such sequences of commands may occur at different times and steps 2040, 2042, 2044 may be separated by extended periods of use, including other host startup sequences, which may include replaying of a previously logged startup sequence. During a host startup sequence 2045, a memory system determines if a host has sent an indicator 2046 (e.g. an indicator that indicates a command sequence to be replayed). If no indicator has been received, then the host startup sequence proceeds without command replay 2048 (e.g. with host sending commands individually and the memory system responding). If an indicator has been received, then the startup sequence corresponding to the indicator is identified 2050. For example, the indicator may correspond to one of the N startup sequences for which logs were generated and written to non-volatile memory in steps 2040, 2042, 2044. The corresponding sequence is read from non-volatile memory 2052, and is replayed (re-executed) 2054.

FIG. 21 shows an example of a method that includes executing in a solid state drive a set of commands received from a host connected to the solid state drive, the set of commands specifying source addresses in the non-volatile memory and destination addresses in a host memory 2440 and saving the set of commands in a non-volatile memory in the solid state drive 2442. The method includes subsequently receiving an indicator in the solid state drive from the host system, the indicator identifying the set of commands 2444 and in response to receiving the indicator from the host system, the solid state drive executing the set of commands saved in the non-volatile memory including copying data from the source addresses in the non-volatile memory to the destination addresses in the host memory 2446.

An example of a memory system includes a non-volatile memory; and a controller connected to the non-volatile memory, wherein the controller is configured to: receive a set of commands from a host during a first host startup sequence, write the set of commands in the non-volatile memory, and in response to receiving an indicator from the host, execute the set of commands written in the non-volatile memory during a second host startup sequence.

The controller may be configured to, execute the set of commands received from the host including at least one read command directed to host startup data written in the non-volatile memory; and to execute the set of commands written in the non-volatile memory during the second host startup sequence including the at least one read command directed to host startup data written in the non-volatile memory. The controller may be configured to receive the set of commands from the host through a host interface during the first host startup sequence and to subsequently execute the set of commands from the non-volatile memory during the second host startup sequence without receiving the set of commands from the host through the host interface during the second host startup sequence. The first host startup sequence may have a first startup time and the second host startup sequence may have a second host startup time that is less than the first host startup time. The set of commands may include one or more read commands specifying source addresses in the non-volatile memory and destination addresses in a host memory; and the controller may be configured to execute the set of commands from the non-volatile memory by reading specified data from the source addresses in the non-volatile memory and writing the specified data to the destination addresses in the host memory. The destination addresses in the host memory may be located in a Host Memory Buffer. A plurality of sets of commands may be written in the non-volatile memory, each set of commands having a corresponding indicator; the controller may be configured to select an individual set of commands from the plurality of sets of commands in response to receiving an individual indicator associated with the individual set of commands; and the controller may be configured to execute the individual set of commands from the non-volatile memory. Each set of commands may include one or more read commands from a host specifying a source address in the non-volatile memory and a destination address in the host memory, one or more pointers, one or more doorbells, and one or more time stamps. The non-volatile memory and the controller may be part of a solid state drive; and the controller may be further configured to implement a NVM Express interface with the host. The controller may be further configured to store the set of commands in a log in the memory system prior to writing the set of commands in the non-volatile memory; and write the set of commands to the non-volatile memory from the log. The controller may be further configured to store, in the log, timing information for the set of commands; and use the timing information to execute the set of commands from the non-volatile memory.

An example of a method includes executing in a solid state drive a set of commands received from a host connected to the solid state drive, the set of commands specifying source addresses in a non-volatile memory and destination addresses in a host memory; saving the set of commands in a non-volatile memory in the solid state drive; subsequently receiving an indicator in the solid state drive from the host, the indicator identifying the set of commands; and in response to receiving the indicator from the host, the solid state drive executing the set of commands saved in the non-volatile memory including copying data from the source addresses in the non-volatile memory to the destination addresses in the host memory.

The set of commands may be received from the host during a first host startup sequence and the indicator may be subsequently received from the host during a second host startup sequence. The second startup sequence may be faster than the first host startup sequence. The method may further include saving one or more additional sets of commands received from the host during one or more additional host startup sequences in the non-volatile memory and subsequently executing the one or more additional sets of commands in response to one or more additional indicators from the host system. The destination addresses in the host memory may be located in a Host Memory Buffer and data from the source addresses in the non-volatile memory may be copied to the destination addresses in the Host Memory Buffer.

An example of an apparatus includes a host interface configured to be connected to a host; a memory interface configured to be connected to non-volatile memory; and a processor connected to the host interface and the memory interface, wherein the processor is configured to: execute a sequence of commands for memory operations, and replay the sequence of commands by writing a copy of the sequence of commands to a non-volatile memory via the non-volatile memory interface and subsequently reading and executing the copy of the sequence of commands from the non-volatile memory.

The processor may be further configured to: receive an indicator from the host; identify a corresponding sequence of commands corresponding to the indicator from a plurality of sequences of commands in the non-volatile memory; replay the corresponding sequence of commands; and inform the host that the corresponding sequence of commands are executed.

An example of a solid state drive includes a non-volatile memory die; and a controller connected to the non-volatile memory die and configured to communicate with a host external to the solid state drive, the controller comprising: a command log configured to store a sequence of commands received from a host during a first host startup sequence, and means for replaying the sequence of commands during a second host startup sequence in response to a host indicator directed to the sequence of commands by reading the sequence of commands from the command log, writing the sequence of commands read to the non-volatile memory die, and executing, at the controller, the sequence of commands from the non-volatile memory die.

The controller may be further configured to: store the sequence of commands received from the host in response to a first host indicator; and replay the sequence of commands, by reading and executing the sequence of commands from the non-volatile memory die, in response to a second host indicator that uniquely specifies the sequence of commands.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A memory system, comprising:
non-volatile memory configured to store a plurality of sets of commands, each set of commands having a corresponding indicator; and
a controller connected to the non-volatile memory, wherein the controller is configured to:
execute an individual set of commands for memory operations,
write a copy of the individual set of commands to the non-volatile memory, receive an individual indicator from the host,
select the individual set of commands from the plurality of sets of commands in response to receiving the individual indicator associated with the individual set of commands,
read and execute the individual set of commands stored in the non-volatile memory during a host startup sequence, and
inform the host that the individual set of commands is executed.

2. The memory system of claim 1, wherein:
the controller is configured to receive the individual set of commands from the host during a first host startup sequence, the individual set of commands including at least one read command directed to host startup data written in the non-volatile memory; and
the controller is configured to, in response to receiving the individual indicator, execute the individual set of commands written in the non-volatile memory during the second host startup sequence including the at least one read command directed to host startup data written in the non-volatile memory.

3. The memory system of claim 1 wherein, the controller is configured to receive the individual set of commands from the host through a host interface during a recorded host startup sequence and to subsequently execute the individual set of commands from the non-volatile memory during the host startup sequence without receiving the set of commands from the host through the host interface during the host startup sequence.

4. The memory system of claim 3, wherein:
the recorded host startup sequence has a first host startup time and the host startup sequence has a second host startup time that is less than the first host startup time.

5. The memory system of claim 1, wherein:
the individual set of commands includes one or more read commands specifying source addresses in the non-volatile memory and destination addresses in a host memory; and
the controller is configured to execute the individual set of commands from the non-volatile memory by reading specified data from the source addresses in the non-volatile memory and writing the specified data to the destination addresses in the host memory.

6. The memory system of claim 5 wherein the destination addresses in the host memory are located in a Host Memory Buffer.

7. The memory system of claim 1, wherein the controller is further configured to:
receive the individual set of commands from a host during a recorded host startup sequence; and
write the individual set of commands in the non-volatile memory.

8. The memory system of claim 1, wherein:
each set of commands includes one or more read commands from a host specifying a source address in the non-volatile memory and a destination address in a host memory, one or more pointers, one or more doorbells, and one or more time stamps.

9. The memory system of claim 1, wherein:
the non-volatile memory and the controller are part of a solid state drive; and
the controller is further configured to implement a NVM Express interface with the host.

10. The memory system of claim 1, wherein the controller is further configured to:
store the individual set of commands in a log in the memory system prior to writing the set of commands in the non-volatile memory; and
write the individual set of commands to the non-volatile memory from the log.

11. The memory system of claim 10, wherein the controller is further configured to:
store, in the log, timing information for the individual set of commands; and
use the timing information to execute the individual set of commands from the non-volatile memory.

12. A method, comprising:
executing in a solid state drive a plurality of sets of commands received from a host connected to the solid state drive, each set of the plurality of sets of commands specifying respective source addresses in non-volatile memory and destination addresses in a host memory;
saving the plurality of sets of commands in a non-volatile memory in the solid state drive;
subsequently receiving an indicator in the solid state drive from the host;
identifying a corresponding set of commands corresponding to the indicator from the plurality of sets of commands;
the solid state drive reading and executing the corresponding set of commands saved in the non-volatile memory including copying data from the respective source addresses in the non-volatile memory to the respective destination addresses in the host memory; and
informing the host that the set of commands is executed.

13. The method of claim 12, wherein the corresponding set of commands are received from the host during a first host startup sequence and the indicator is subsequently received from the host during a second host startup sequence.

14. The method of claim 13, wherein the second host startup sequence is faster than the first host startup sequence.

15. The method of claim 13, further comprising:
saving one or more additional sets of commands received from the host during one or more additional host startup sequences in the non-volatile memory and subsequently executing the one or more additional sets of commands in response to one or more additional indicators from the host.

16. The method of claim 15, wherein the destination addresses in the host memory are located in a Host Memory Buffer and data from the source addresses in the non-volatile memory are copied to the destination addresses in the Host Memory Buffer.

17. An apparatus, comprising:
a host interface configured to be connected to a host;
a memory interface configured to be connected to non-volatile memory; and
a processor connected to the host interface and the memory interface, wherein the processor is configured to:
execute a sequence of commands for memory operations,
receive an indicator from the host;
identify the sequence of commands corresponding to the indicator from a plurality of sequences of commands in the non-volatile memory;
replay the sequence of commands by writing a copy of the sequence of commands to a non-volatile memory via the memory interface and subsequently reading and executing the copy of the sequence of commands from the non-volatile memory; and inform the host that the sequence of commands is executed.

18. The apparatus of claim 17, wherein the processor is further configured to receive the sequence of commands from the host during a first host startup sequence and to subsequently read and execute the copy of the sequence of commands from the non-volatile memory during a second host startup sequence.

19. A solid state drive, comprising:

a non-volatile memory die; and a controller connected to the non-volatile memory die and configured to communicate with a host external to the solid state drive, the controller comprising:

a command log configured to store a plurality of sequences of commands including a sequence of commands received from a host during a first host startup sequence in response to a first host indicator, means for identifying the sequence of commands from the plurality of sequences of commands in response to a second indicator directed to the sequence of commands; and means for replaying the sequence of commands during a second host startup sequence in response to the second host indicator by reading the sequence of commands from the command log, writing the sequence of commands read to the non-volatile memory die, executing, at the controller, the sequence of commands from the non-volatile memory die, and informing the host that the sequence of commands is executed.

20. The solid state drive of claim 19, wherein the sequence of commands includes one or more read commands specifying source addresses in the non-volatile memory die and destination addresses in a host memory.

* * * * *